United States Patent
Yi et al.

(10) Patent No.: US 10,979,265 B2
(45) Date of Patent: Apr. 13, 2021

(54) METHOD AND APPARATUS FOR CONFIGURING CONTROL CHANNEL FOR NR IN WIRELESS COMMUNICATION SYSTEM

(71) Applicant: LG Electronics Inc., Seoul (KR)

(72) Inventors: Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/466,967

(22) PCT Filed: Dec. 7, 2017

(86) PCT No.: PCT/KR2017/014326
§ 371 (c)(1),
(2) Date: Jun. 5, 2019

(87) PCT Pub. No.: WO2018/106043
PCT Pub. Date: Jun. 14, 2018

(65) Prior Publication Data
US 2019/0356524 A1 Nov. 21, 2019

Related U.S. Application Data

(60) Provisional application No. 62/577,153, filed on Oct. 25, 2017, provisional application No. 62/548,980, (Continued)

(51) Int. Cl.
*H04L 27/26* (2006.01)
*H04L 5/00* (2006.01)
(Continued)

(52) U.S. Cl.
CPC ........ *H04L 27/2602* (2013.01); *H04L 5/0053* (2013.01); *H04L 5/0094* (2013.01);
(Continued)

(58) Field of Classification Search
CPC . H04B 7/0617; H04B 7/0695; H04L 27/2602; H04L 27/2655; H04L 5/0023;
(Continued)

(56) References Cited

U.S. PATENT DOCUMENTS

2013/0286965 A1   10/2013   Xu et al.
2015/0103777 A1   4/2015    Chen et al.
(Continued)

FOREIGN PATENT DOCUMENTS

WO   WO2016099196   6/2016

OTHER PUBLICATIONS

Catt, "NR PBCH and NR physical channel carried system information", R1-1704538, 3GPP TSG RAN WG1 Meeting #88bis, Spokane, USA, Apr. 3-7, 2017, 4 pages.
(Continued)

*Primary Examiner* — Kibrom T Hailu
*Assistant Examiner* — Nizam U Ahmed
(74) *Attorney, Agent, or Firm* — Fish & Richardson P.C.

(57) ABSTRACT

A method and apparatus for determining a control resource set for system information in a wireless communication system is provided. A user equipment (UE) receives a configuration of control resource set (CORESET) for remaining system information (RMSI) via a synchronization signal (SS) block from a network, and determines the control resource set for the RMSI according to the configuration. The SS block may include a physical broadcast channel (PBCH). A time and frequency location of a common search
(Continued)

space (CSS) for the RMSI may be aligned with the SS block by at least one of time division multiplexing (TDM) or frequency division multiplexing (FDM).

13 Claims, 18 Drawing Sheets

Related U.S. Application Data filed on Aug. 23, 2017, provisional application No. 62/519,813, filed on Jun. 14, 2017, provisional application No. 62/513,968, filed on Jun. 1, 2017, provisional application No. 62/501,072, filed on May 3, 2017, provisional application No. 62/488,037, filed on Apr. 20, 2017, provisional application No. 62/480,456, filed on Apr. 2, 2017, provisional application No. 62/452,391, filed on Jan. 31, 2017, provisional application No. 62/431,366, filed on Dec. 7, 2016.

(51) Int. Cl.
*H04W 48/16* (2009.01)
*H04W 72/12* (2009.01)

(52) U.S. Cl.
CPC ......... *H04L 27/2655* (2013.01); *H04W 48/16* (2013.01); *H04W 72/1289* (2013.01)

(58) Field of Classification Search
CPC ... H04L 5/0048; H04L 5/0053; H04L 5/0082; H04L 5/0094; H04W 48/16; H04W 72/1289
USPC .......................................................... 370/329
See application file for complete search history.

(56) References Cited

U.S. PATENT DOCUMENTS

| | | | |
|---|---|---|---|
| 2015/0173004 A1* | 6/2015 | Nigam ................ | H04W 56/001 370/331 |
| 2015/0289144 A1* | 10/2015 | Yi ....................... | H04W 72/042 370/252 |
| 2018/0098361 A1* | 4/2018 | Ji ......................... | H04L 5/0092 |

OTHER PUBLICATIONS

CMCC, "Gradual UE-Specific (GUS) initial access and multi-beam-based mobility management", R1-167114, 3GPP TSG RAN WG1 Meeting #86, Göteborg, Sweden, Aug. 10-14, 2016, 6 pages.
EP Search Report in European Application No. EP 17878663, dated Nov. 6, 2019, 12 pages.
LG Electronics, "Discussion on system information delivery", R1-1702439, 3GPP TSG RAN WG1 Meeting #88, Athens, Greece Feb. 13-1, 2017, 4 pages.
Nokia, Alcatel-Lucent Shanghai Bell, "On Remaining System Information Delivery", R1-1705841, 3GPP TSG-RAN WG1 Meeting #88bis, Spokane, WA, USA Apr. 3-7, 2017, 5 pages.
NTT Docomo, Inc., "Discussion on broadcast signal/channel design for NR", R1-1612722, 3GPP TSG RAN WG1 Meeting #87, Reno, USA Nov. 14-18, 2016, 6 pages.
NTT Docomo, Inc., "Discussion on broadcast signal/channel design for NR", R1-1700611, 3GPP TSG RAN WG1 AH_NR Meeting, Spokane, USA, Jan. 16-20, 2017, 6 pages.
ASTRI, TCL Communication Ltd., "Efficient design of SS block," R1-1612289, 3GPP TSG-RAN WG1 #87, Reno, US, Nov. 14-18, 2016, 9 pages.
Ericsson, "System information delivery in NR," R1-1611901, 3GPP TSG-RAN WG1 Meeting #87, Reno, Nevada, USA, Nov. 14-18, 2016, 7 pages.
CMCC, "Gradual UE specific (GUS) initial access and channel associations," R1-1612181, 3GPP TSG RAN WG1 Meeting #86bis, Reno, USA, Nov. 10-14, 2016, 4 pages.
Huawei, HiSilicon, "Design of broadcast signal/channel," R1-1611695, 3GPP TSG RAN WG1 Meeting #87, Reno, USA, Nov. 14-18, 2016, 3 pages.
NTT Docomo, Inc., "Discussion on initial access procedure for NR," R1-1612723, 3GPP TSG RAN WG1 Meeting #87, Reno, USA, Nov. 14-18, 2016, 5 pages.
KR Office Action in Korean Appln. No. 10-2020-7019235, dated Jan. 20, 2021, 11 pages (with English translation).
NTT Docomo, Inc., "Discussion and evaluation on NR-PBCH design," R1-1705708, 3GPP TSG RAN WG1 Meeting #88bis Spokane, USA, dated Apr. 3-7, 2017, 7 pages.
ZTE, ZTE Microelectronics, "Remaining minimum system information," R1-1704362, 3GPP TSG RAN WG1 Meeting #88bis, Spokane, USA, dated Apr. 3-7, 2017, 10 pages.

\* cited by examiner

[Fig. 1]
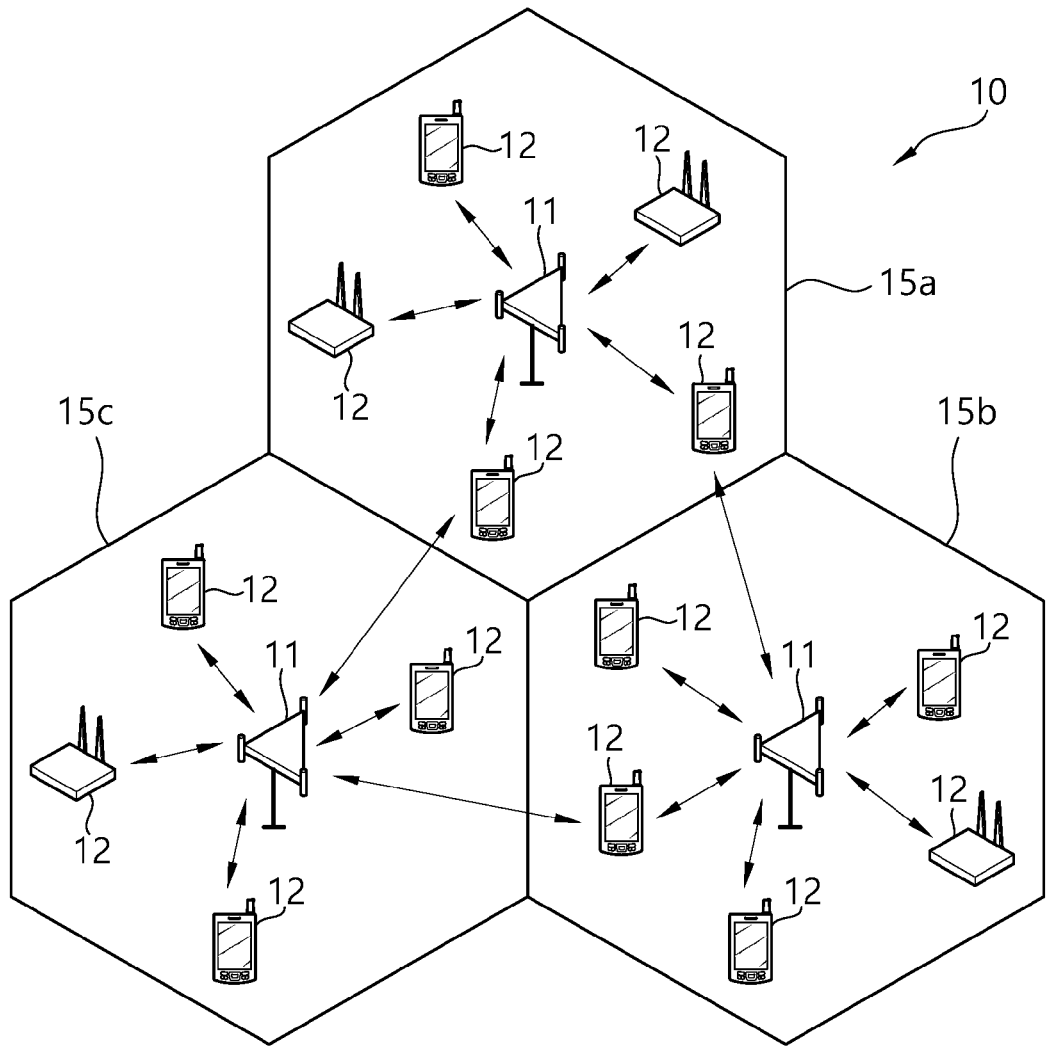
[Fig. 2]
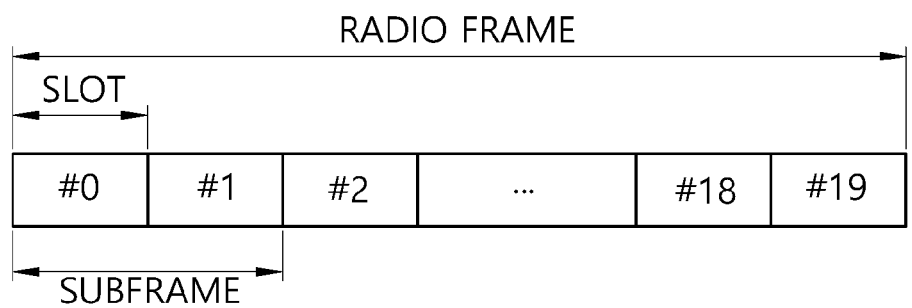

[Fig. 3]
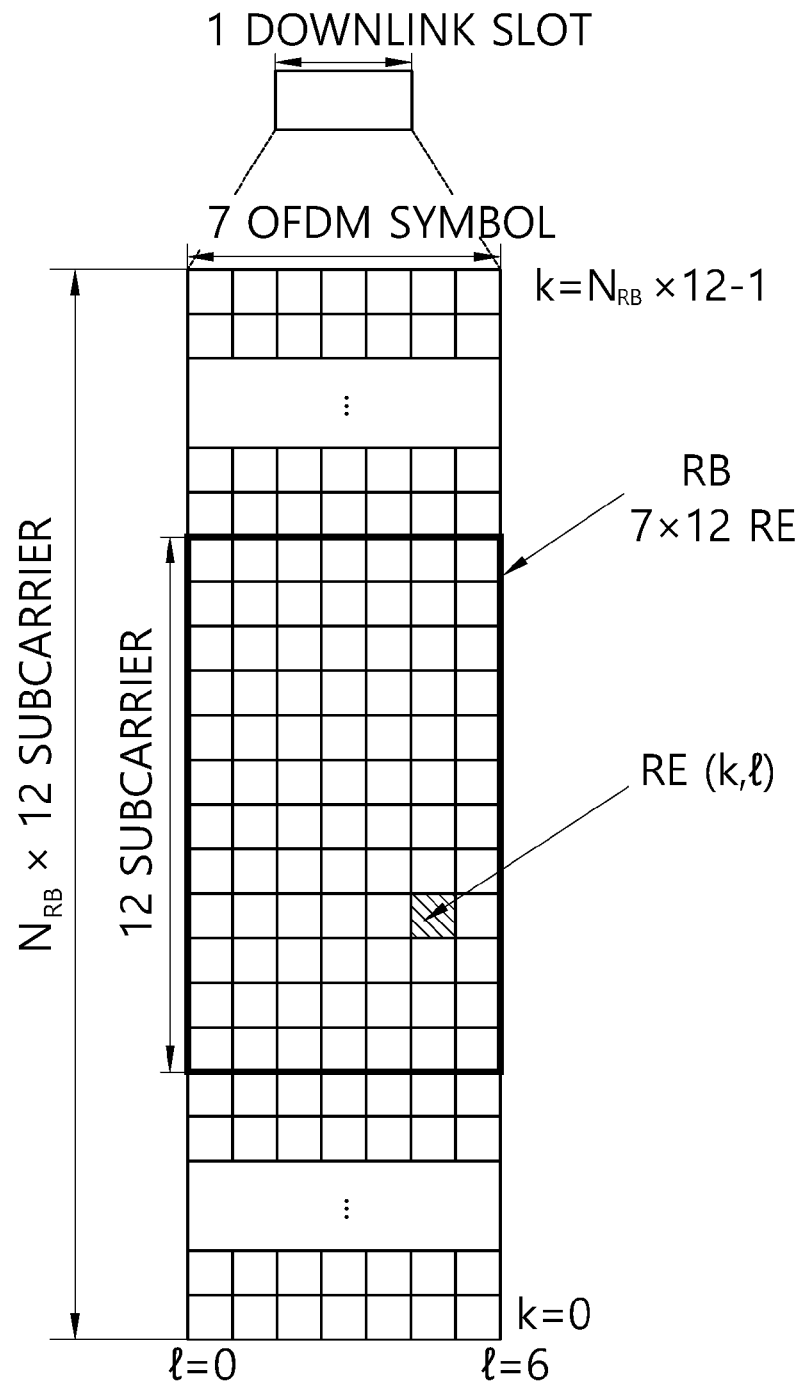

[Fig. 4]
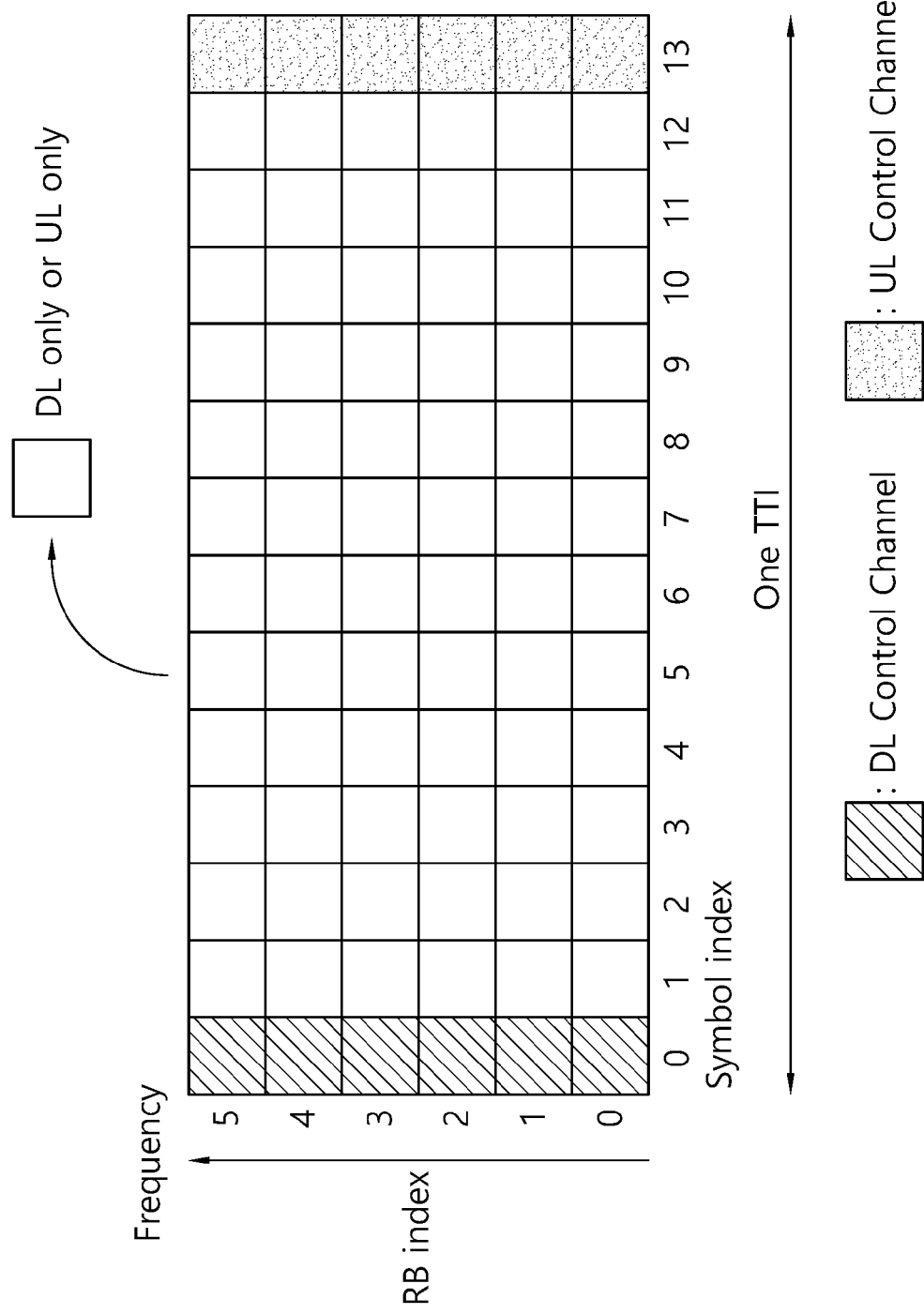

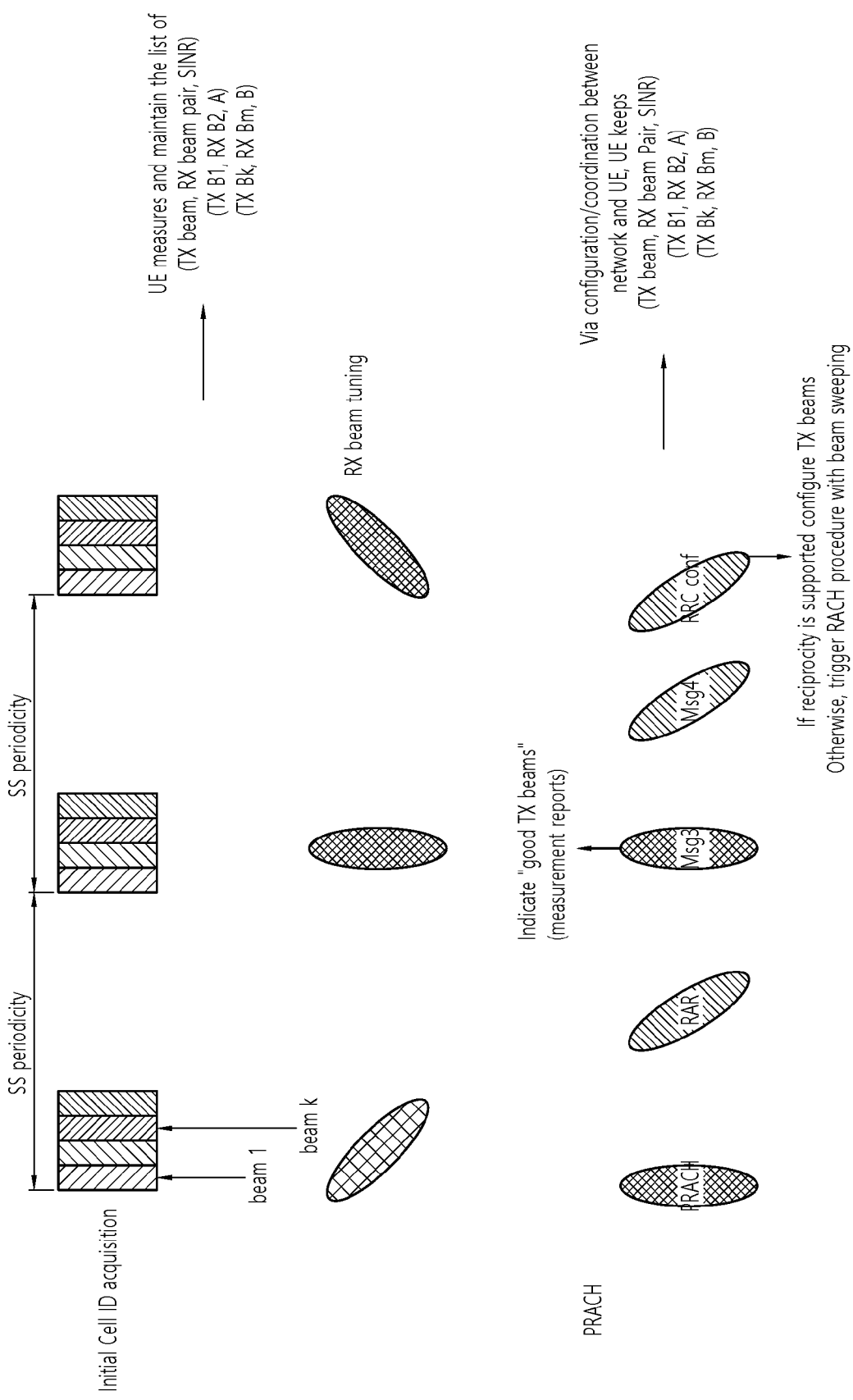
[Fig. 5]

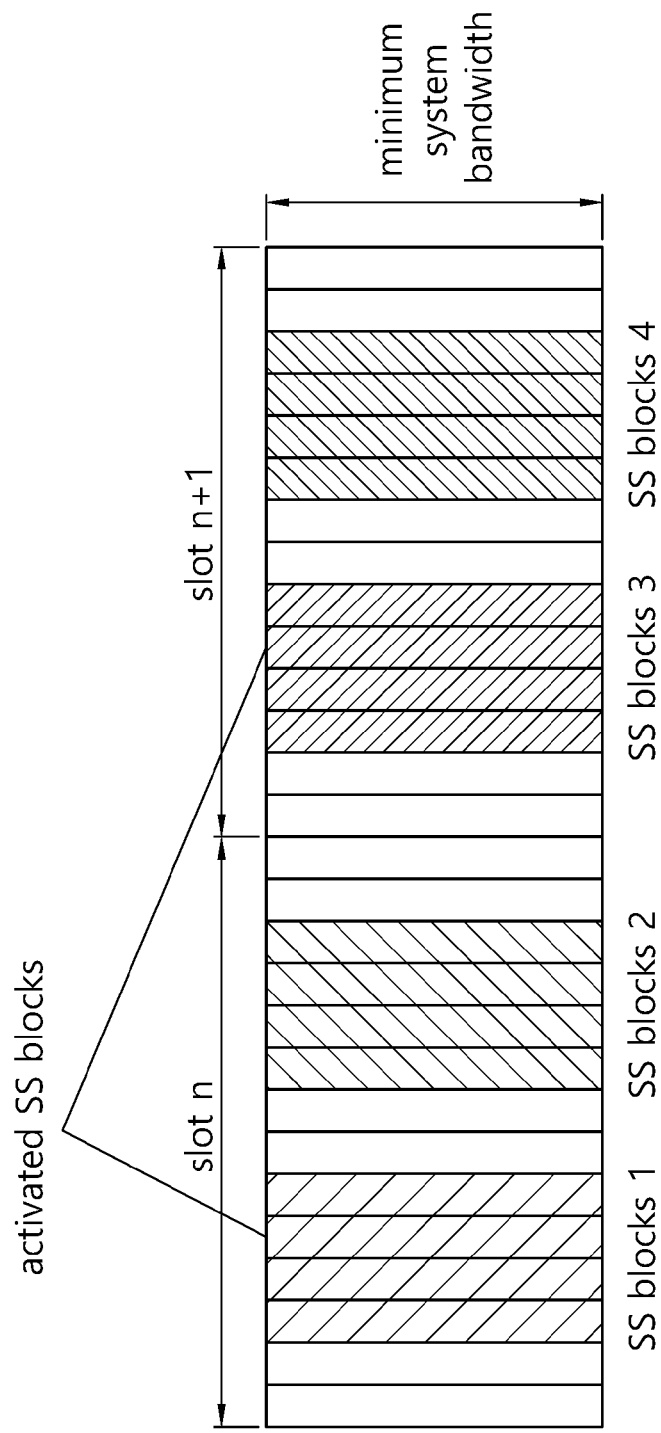
[Fig. 6]

[Fig. 7]
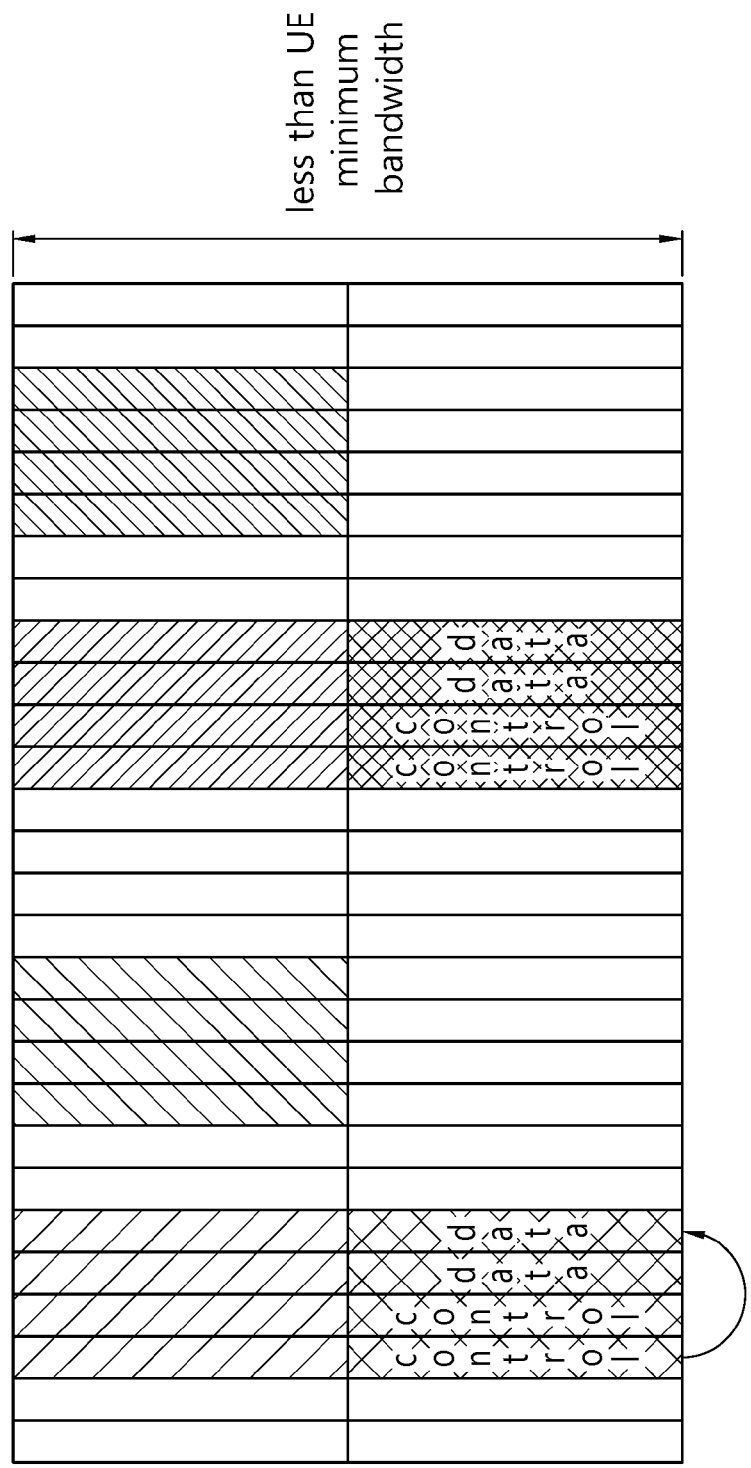

[Fig. 8]
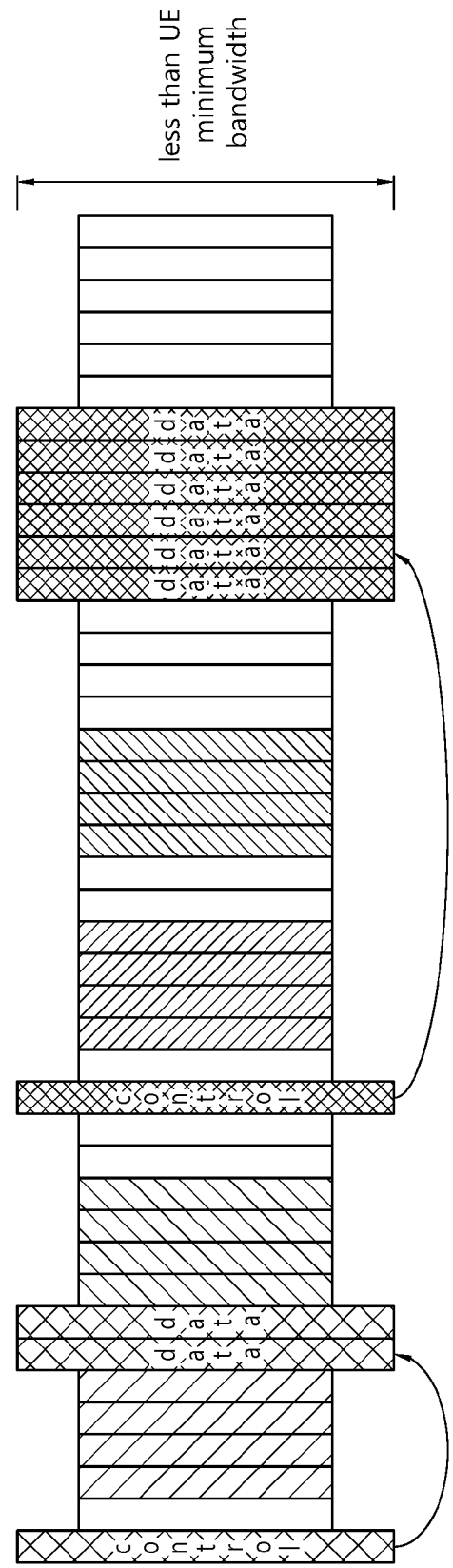

[Fig. 9]
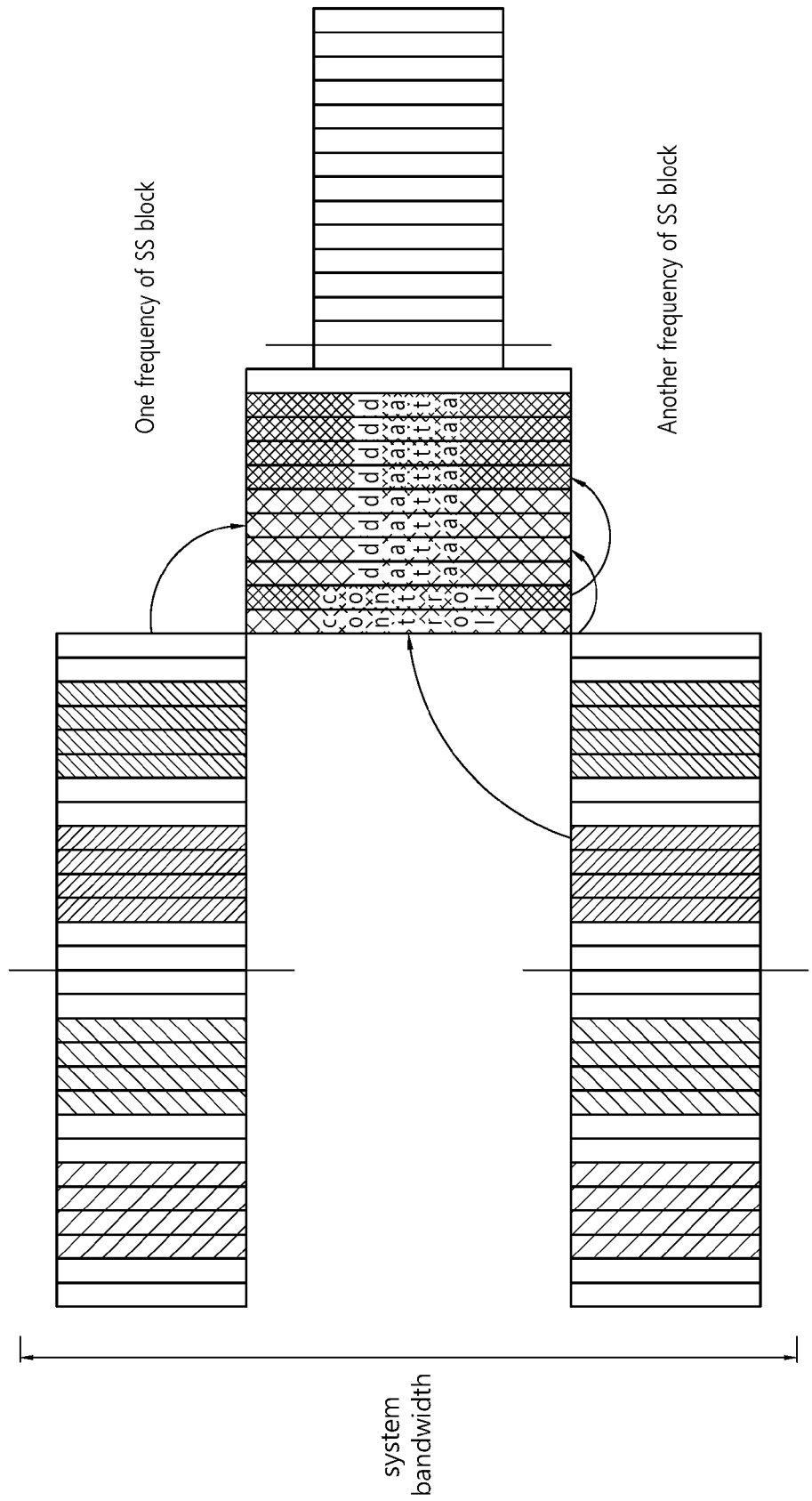

[Fig. 10]
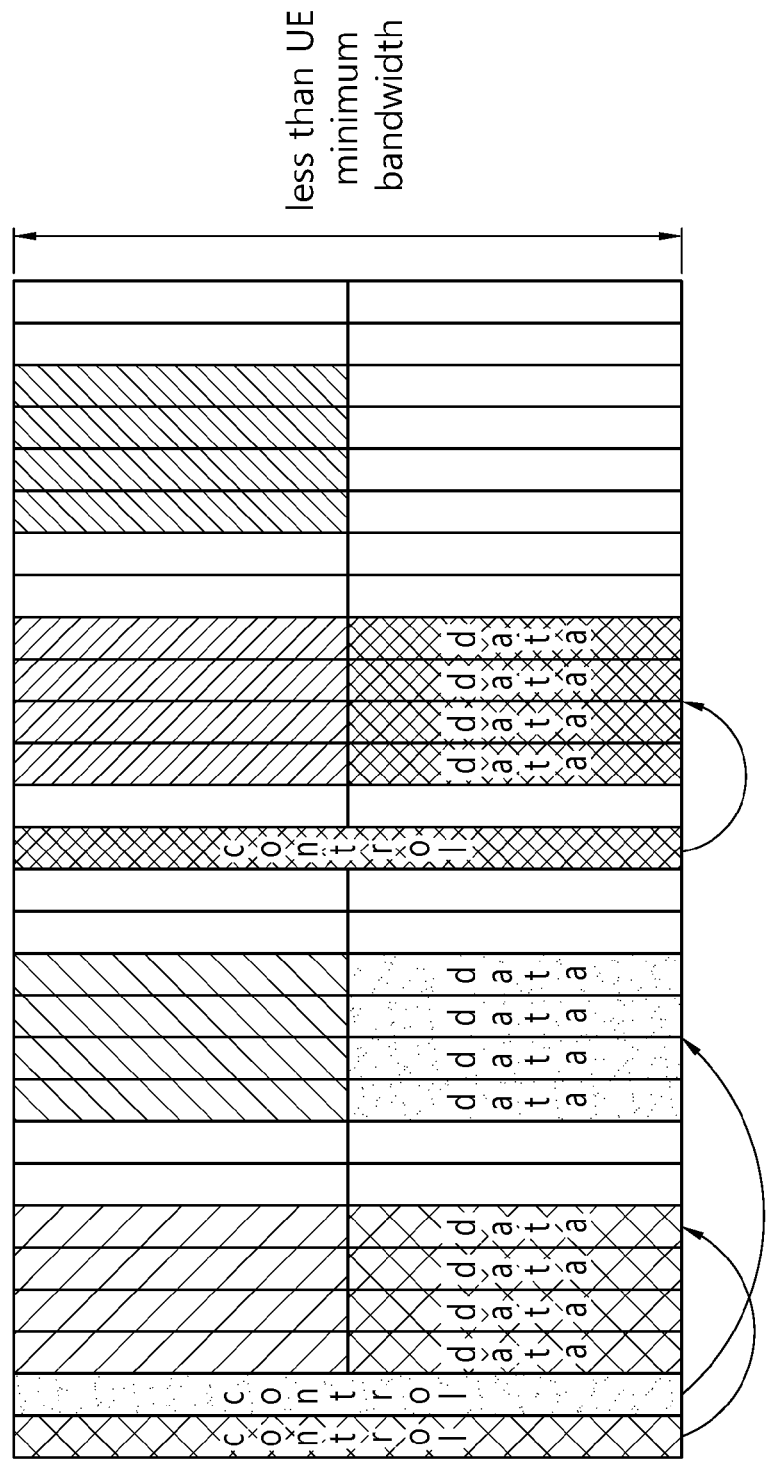

[Fig. 11]
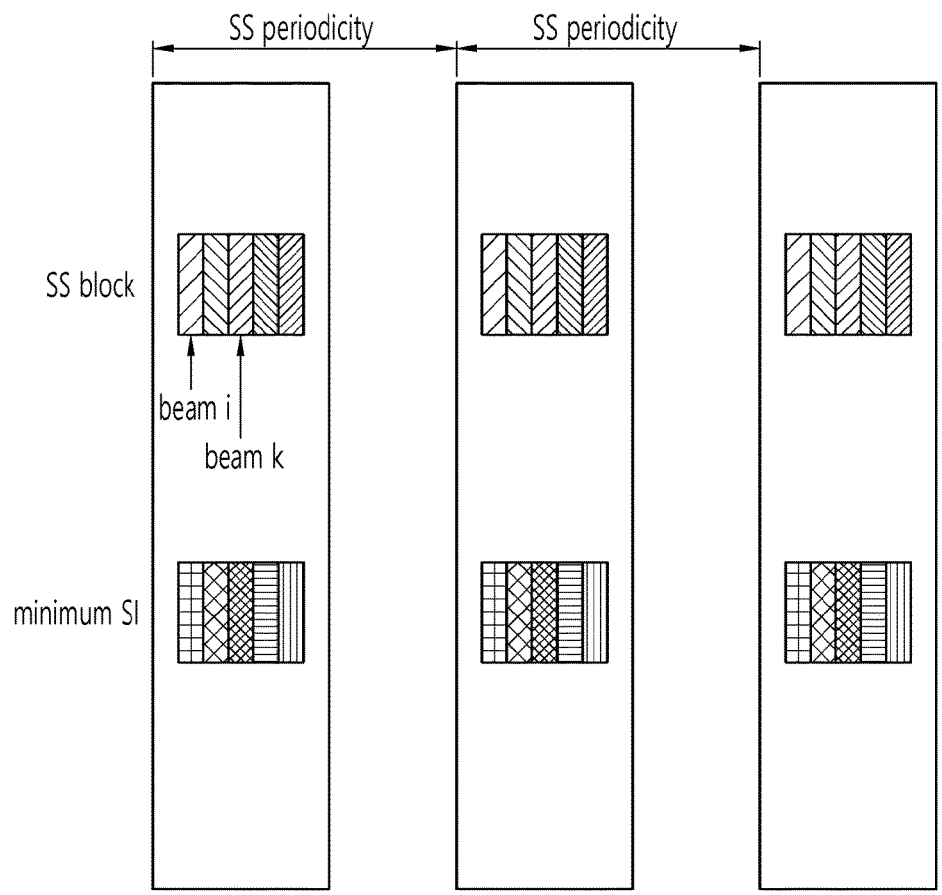
[Fig. 12]
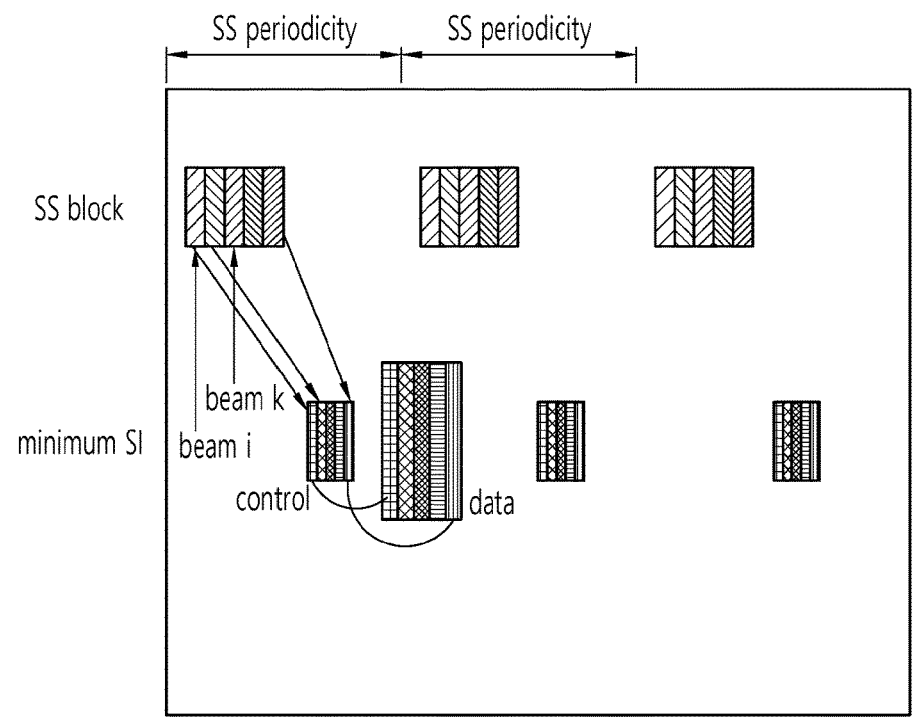

[Fig. 13]
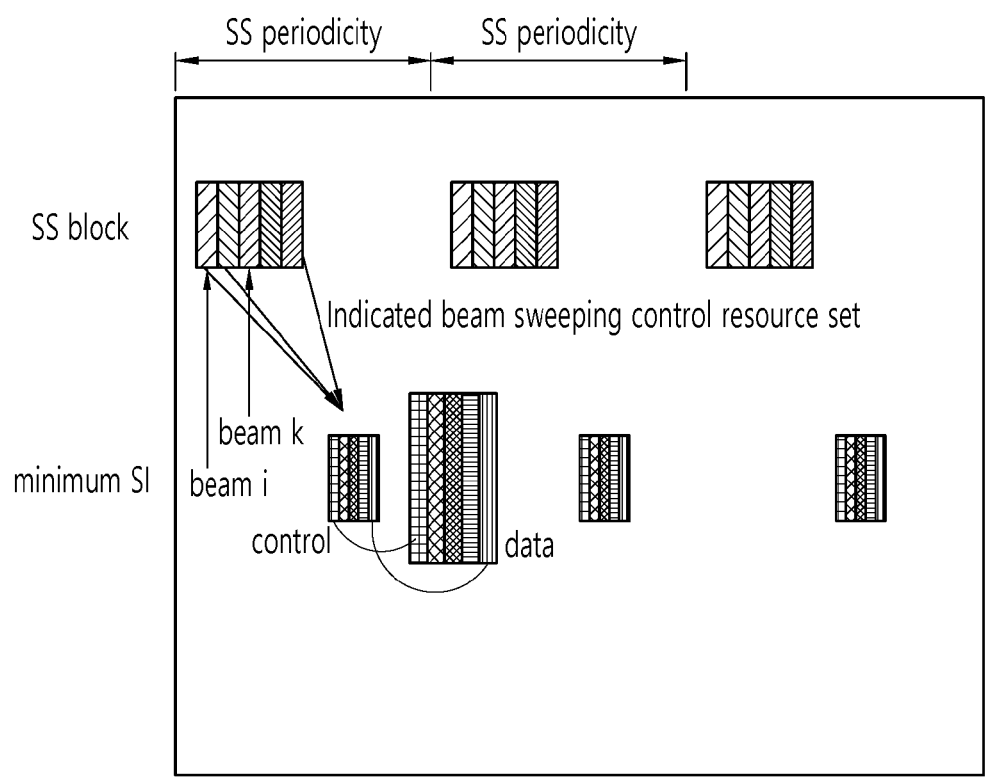

[Fig. 14]
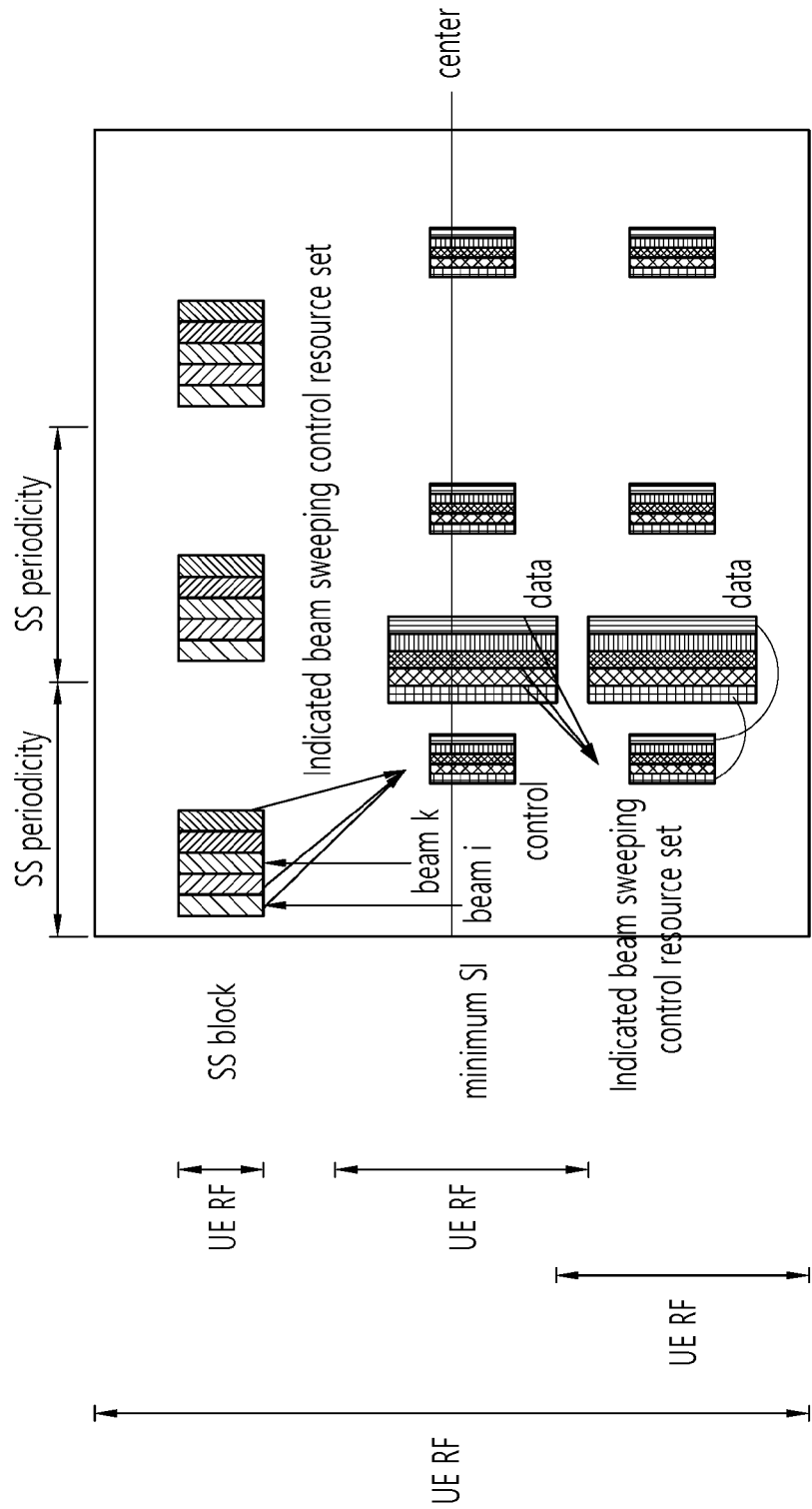

[Fig. 15]
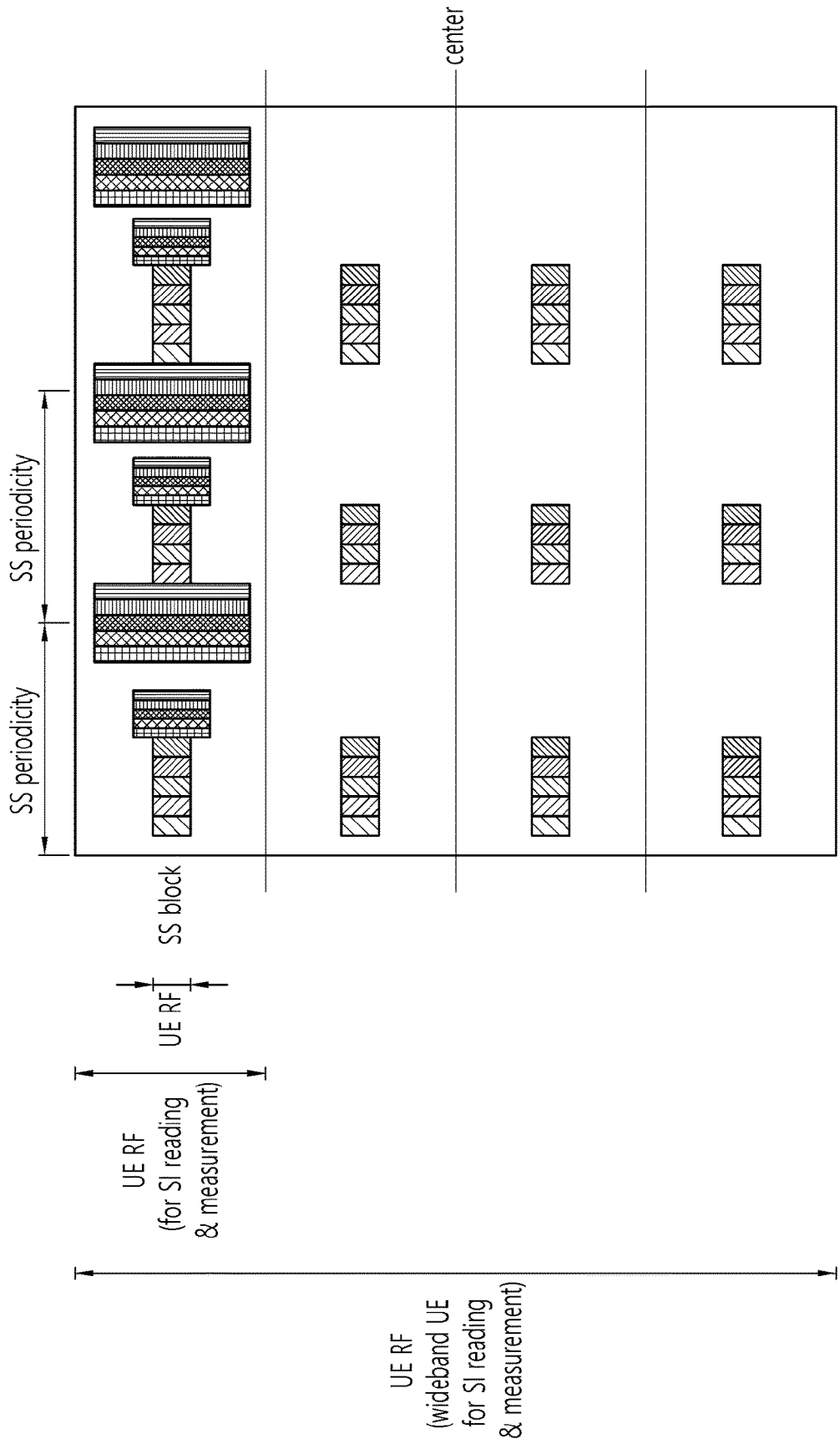

[Fig. 16]
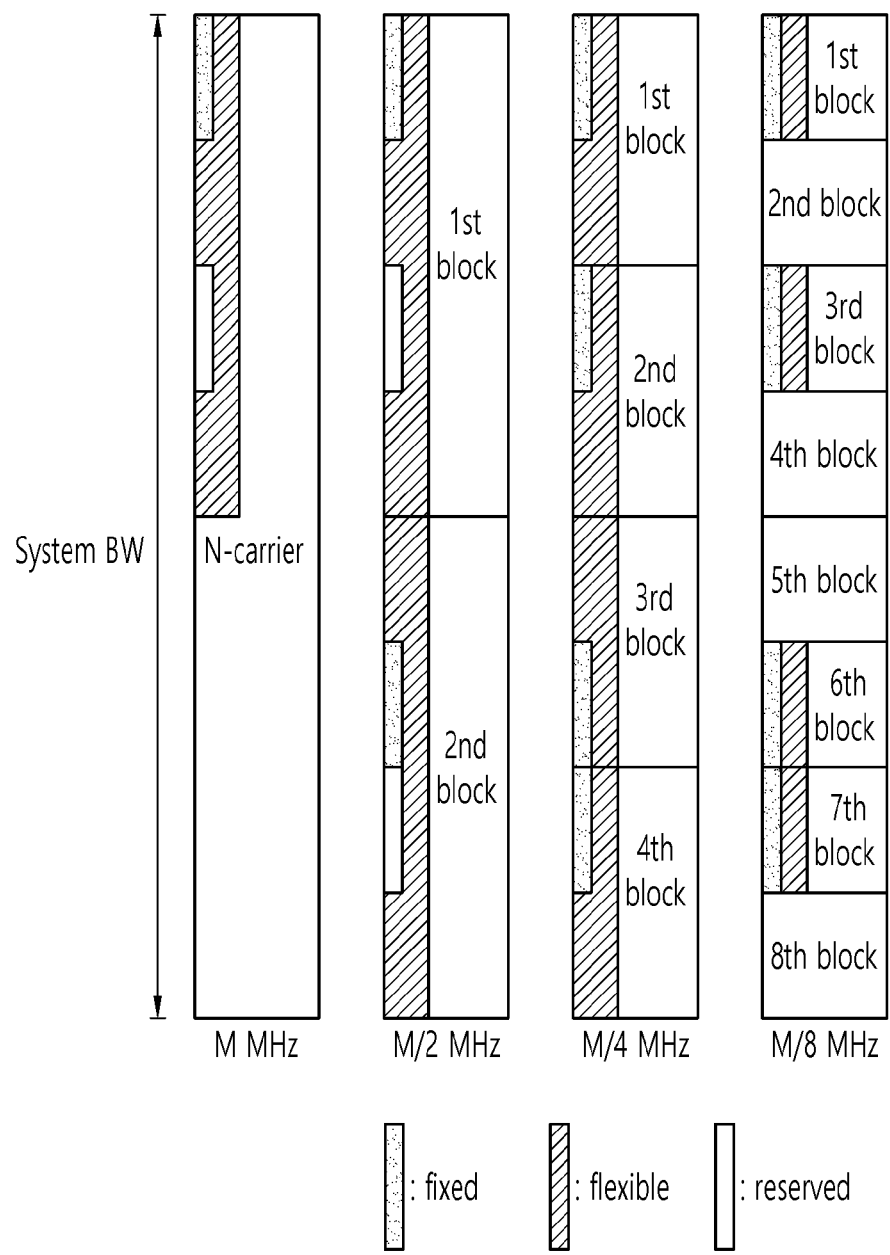

[Fig. 17]

| CCE 1 | CCE 9 |
| CCE 3 | CCE 10 |
| CCE 5 | CCE 11 |
| CCE 7 | CCE 12 |
| CCE 2 | CCE 13 |
| CCE 4 | CCE 14 |
| CCE 6 | CCE 15 |
| CCE 8 | CCE 16 |
| CCE 17 ||
| CCE 18 ||
| CCE 19 ||
| CCE 20 ||
| CCE 21 ||
| CCE 22 ||
| CCE 23 ||
| CCE 24 ||
| CCE 25 ||
| CCE 26 ||
| CCE 27 ||
| CCE 28 ||
| CCE 29 ||
| CCE 30 ||
| CCE 31 ||
| CCE 32 ||
|  | CCE 33 |
|  | CCE 34 |
|  | CCE 35 |
|  | CCE 36 |
|  | CCE 37 |
|  | CCE 38 |
|  | CCE 39 |
|  | CCE 40 |
| CCE 41 ||
| CCE 42 ||
| CCE 43 ||
| CCE 44 ||
| CCE 45 ||
| CCE 46 ||
| CCE 47 ||
| CCE 48 ||
| CCE 49 ||
| CCE 50 ||
| CCE 51 ||
| CCE 52 ||
| CCE 52 ||
| CCE 53 ||
| CCE 53 ||
| CCE 54 ||

[Fig. 18]
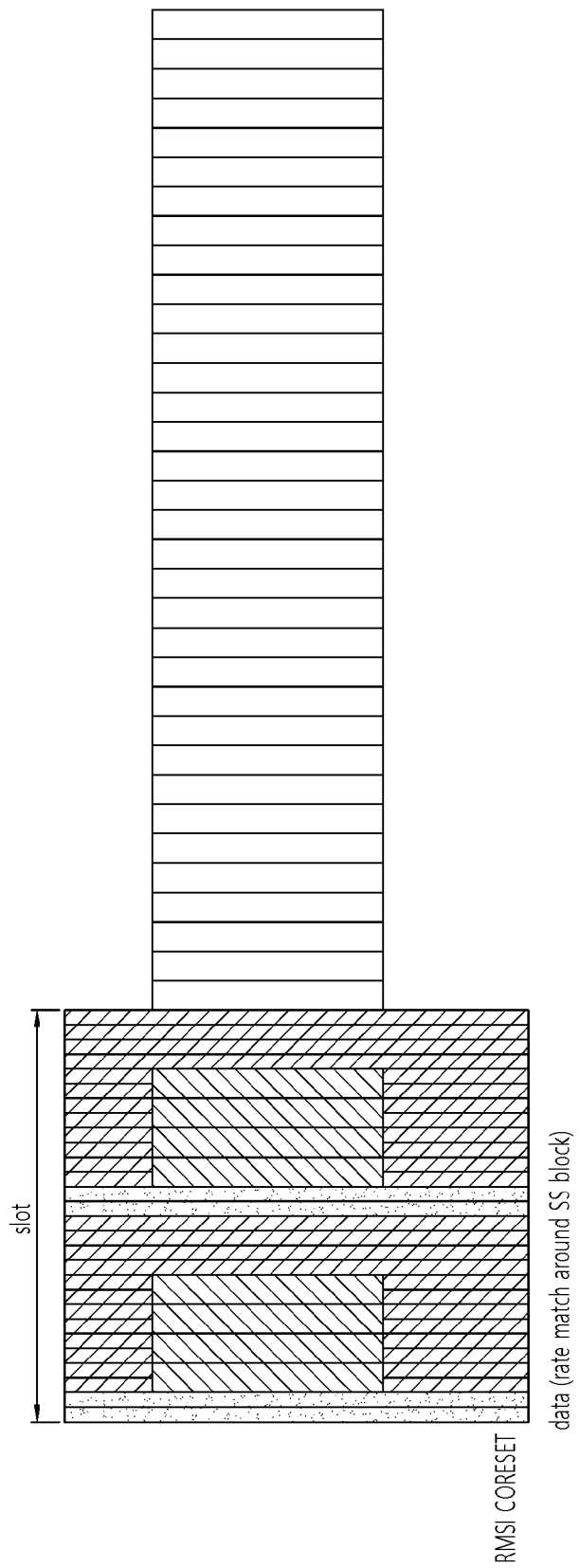

[Fig. 19]
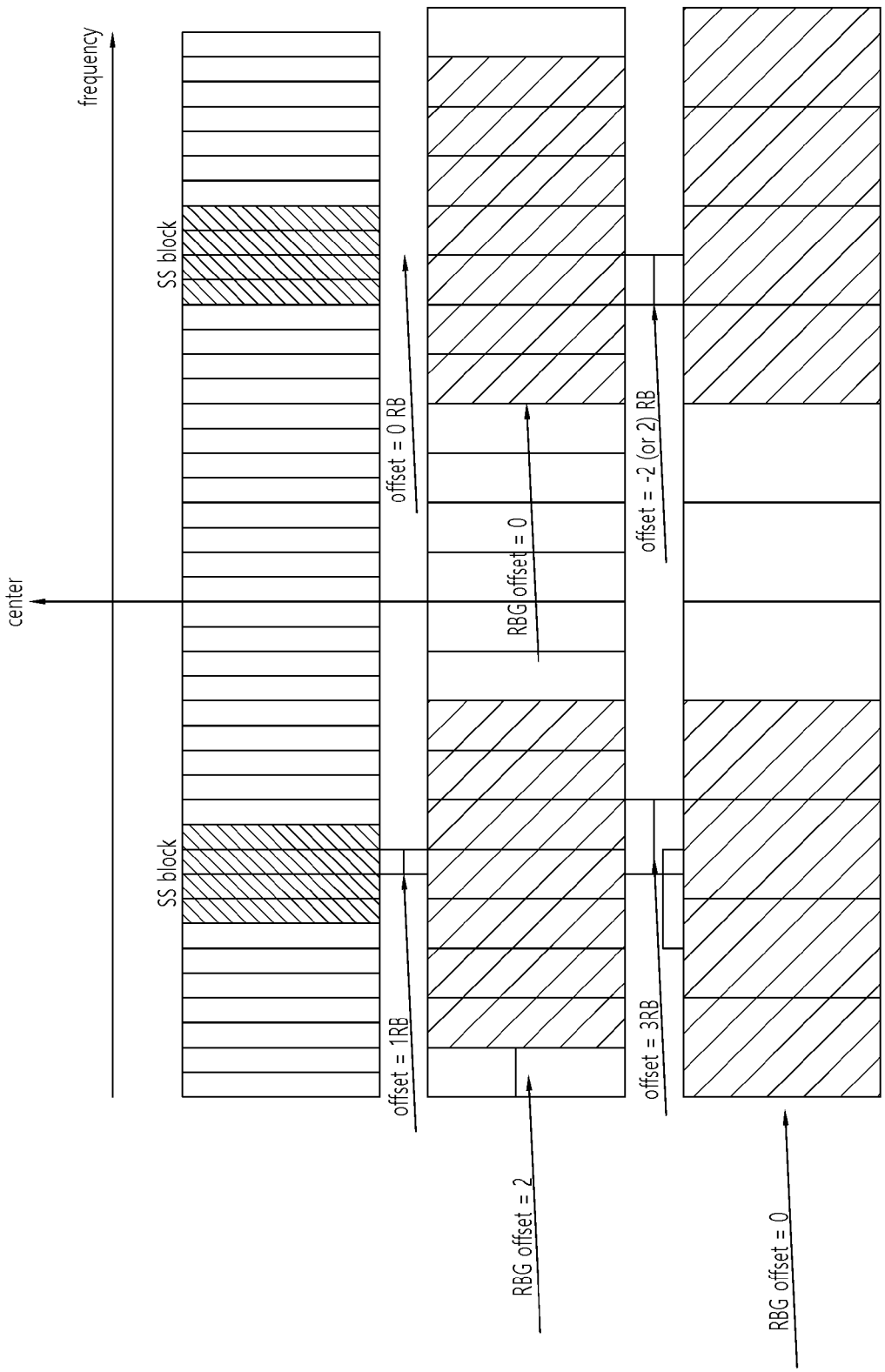

[Fig. 20]
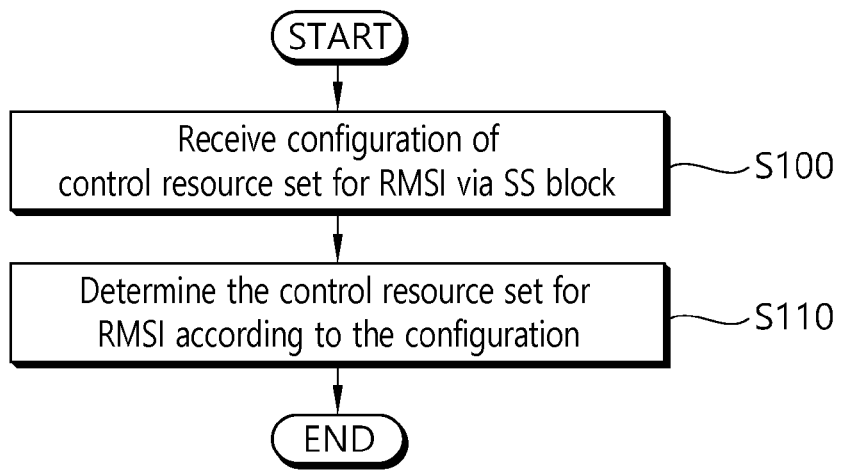
[Fig. 21]
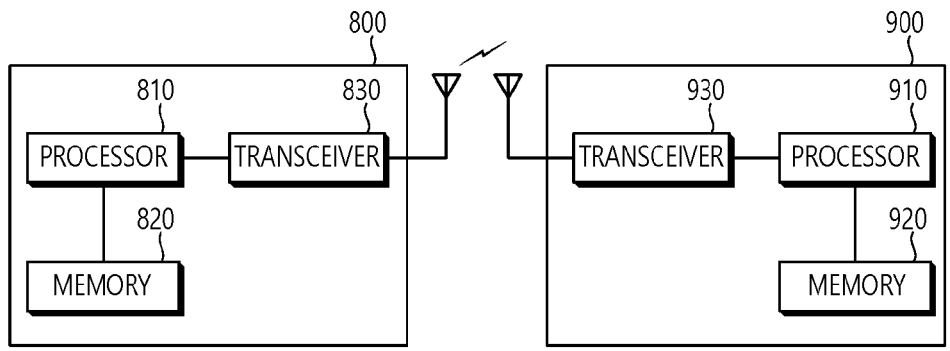

METHOD AND APPARATUS FOR CONFIGURING CONTROL CHANNEL FOR NR IN WIRELESS COMMUNICATION SYSTEM

CROSS-REFERENCE TO RELATED APPLICATIONS

This application is a National Stage application under 35 U.S.C. § 371 of International Application No. PCT/KR2017/014326, filed on Dec. 7, 2017, which claims the benefit of U.S. Provisional Application No. 62/577,153, filed on Oct. 25, 2017, U.S. Provisional Application No. 62/548,980, filed on Aug. 23, 2017, U.S. Provisional Application No. 62/519,813, filed on Jun. 14, 2017, U.S. Provisional Application No. 62/513,968, filed on Jun. 1, 2017, U.S. Provisional Application No. 62/501,072, filed on May 3, 2017, U.S. Provisional Application No. 62/488,037, filed on Apr. 20, 2017, U.S. Provisional Application No. 62/480,456, filed on Apr. 2, 2017, U.S. Provisional Application No. 62/452,391, filed on Jan. 31, 2017, and U.S. Provisional Application No. 62/431,366, filed on Dec. 7, 2016. The disclosures of the prior applications are incorporated by reference in their entirety.

TECHNICAL FIELD

The present invention relates to wireless communications, and more particularly, to a method and apparatus for configuring a control channel for a new radio access technology (NR) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

DISCLOSURE OF INVENTION

Technical Problem

The present invention relates to wireless communications, and more particularly, to a method and apparatus for configuring a control channel for a new radio access technology (NR) in a wireless communication system. The present invention discusses configuration of a control channel in NR where single or multi-beam operation of the network may be used.

Solution to Problem

In an aspect, a method for determining a control resource set for system information by a user equipment (UE) in a wireless communication system is provided. The method includes receiving a configuration of control resource set (CORESET) for remaining system information (RMSI) via a synchronization signal (SS) block from a network, and determining the control resource set for the RMSI according to the configuration. The SS block includes a physical broadcast channel (PBCH).

In another aspect, a user equipment (UE) in a wireless communication system is provided. The UE includes a memory, a transceiver, and a processor, operably coupled to the memory and the transceiver, that controls the transceiver to receive a configuration of control resource set for remaining system information (RMSI) via a synchronization signal (SS) block, and determines the control resource set for the RMSI according to the configuration. The SS block includes a physical broadcast channel (PBCH).

Advantageous Effects of Invention

A control channel or control resource set can be defined efficiently.

BRIEF DESCRIPTION OF DRAWINGS

FIG. 1 shows a 3GPP LTE system.
FIG. 2 shows structure of a radio frame of 3GPP LTE.
FIG. 3 shows a resource grid for one downlink slot.
FIG. 4 shows an example of subframe type for NR.

FIG. 5 shows an example of beam acquisition according to an embodiment of the present invention.

FIG. 6 shows an example of multiple SS blocks mapped in each slot according to an embodiment of the present invention.

FIG. 7 shows an example of configuring RMSI according to an embodiment of the present invention.

FIG. 8 shows another example of configuring RMSI according to an embodiment of the present invention.

FIG. 9 shows another example of configuring RMSI according to an embodiment of the present invention.

FIG. 10 shows another example of configuring RMSI according to an embodiment of the present invention.

FIG. 11 shows an example of handling of beam index according to an embodiment of the present invention.

FIG. 12 shows another example of handling of beam index according to an embodiment of the present invention.

FIG. 13 shows another example of handling of beam index according to an embodiment of the present invention.

FIG. 14 shows an example of other SIB reception according to an embodiment of the present invention.

FIG. 15 shows an example of other SIB reception according to an embodiment of the present invention.

FIG. 16 shows an example of fixed/flexible CORESET configuration according to an embodiment of the present invention.

FIG. 17 shows an example of CCE mapping according to an embodiment of the present invention.

FIG. 18 shows an example of RMSI and SS block transmission according to an embodiment of the present invention.

FIG. 19 shows an example of RBG and PRB grid offset according to an embodiment of the present invention.

FIG. 20 shows a method for determining a control resource set for system information by a UE according to an embodiment of the present invention.

FIG. 21 shows a wireless communication system to implement an embodiment of the present invention.

MODE FOR THE INVENTION

FIG. 1 shows a 3GPP LTE system. The 3rd generation partnership project (3GPP) long-term evolution (LTE) system 10 includes at least one eNodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number $N_{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

NR may use the OFDM transmission scheme or a similar transmission scheme. NR may follow the existing LTE/LTE-A numerology, or may follow the different numerology from the existing LTE/LTE-A numerology. NR may have a larger system bandwidth (e.g. 100 MHz). Or, one cell may support multiple numerologies in NR. That is, UEs operating in different numerologies may coexist within one cell in NR.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data (2) Subframes including DL control, DL data, and UL control (3) Subframes including DL control and UL data (4) Subframes including DL control, UL data, and UL control (5) Subframes including access signals or random access signals or other purposes.

(6) Subframes including both DL/UL and all UL signals.

However, the subframe types listed above are only exemplary, and other subframe types may also be considered.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. A region for DL control channel indicates a transmission area of a physical downlink control channel (PDCCH) for Downlink control information (DCI) transmission, and a region for UL control channel indicates a transmission area of a physical uplink control channel (PUCCH) for uplink control information (UCI) transmission. Here, the control information transmitted by the eNB to the UE through the DCI may include information on the cell configuration that the UE should know, DL specific information such as DL scheduling, and UL specific information such as UL grant. Also, the control information transmitted by the UE to the eNB through the UCI may include a hybrid automatic repeat request (HARM) acknowledgement/non-acknowledgement (ACK/NACK) report for the DL data, a channel state information (CSI) report on the DL channel status, and a scheduling request (SR). The remaining symbols may be used for DL data transmission (e.g. physical downlink shared channel (PDCCH)) or for UL data transmission (e.g. physical uplink shared channel (PUCCH)).

According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Hereinafter, various aspects of configuring a control channel for NR are described according to embodiments of the present invention. In NR, single beam and multi-beam may be expected. The network may deploy single beam or multi-beam, and different single beam may be used in different time. Regardless of single or multi-beam, from a UE perspective, it may be necessary to indicate which resources to monitor for control channel. Particularly, if multi-beam is used or repetition is used, from a UE perspective, the same control channel may be transmitted over multiple occasions.

The present invention discusses how to assign and detect beam direction and also control resource set (CORESET) configuration from a UE perspective for control channel monitoring/reception. Also, the present invention may be applied for UL control transmission. Further, the present application may be applied for sidelink (SL) control transmission.

Initial access according to an embodiment of the present invention is described.

FIG. 5 shows an example of beam acquisition according to an embodiment of the present invention. First, a UE detects synchronization signals which are transmitted based on certain beam direction. The UE may acquire the beam direction by, e.g. beam index, symbol index where synchronization signals are transmitted, synchronization signal (SS) block index, etc. Based on the beam direction, the UE may accumulate multiple synchronization signals from the same or quasi-co-located (QCL) beam direction for synchronization and detection. For the convenience, this may be called as beam index. As mentioned before, beam index may be indicated indirectly via SS block index, combination of cell or transmission (TX) point (TRP) identifier (ID) with SS block index, etc. A UE may maintain multiple of beam indices which are detected above the threshold.

Via initial access procedure such as random access channel (RACH) procedure, a UE may be associated with one or multiple of beam directions. One RRC configuration may be configured per beam direction or associated with multiple beam directions simultaneously. In other words, one or multiple effective beam directions may be configured for a UE. If multiple beam directions are used/configured for a UE, when RACH procedure is triggered by the network, the network may also indicate beam direction where to transmit RACH preamble, and from where the network expects to receive random access response (RAR), etc. One example of multiple beam directions is to support multiple TRP operations and a UE may receive control/data from more than one TRP at a time or over a given time.

During beam coordination (receiver-transmitter beam alignment) procedure, the UE may be coordinated with single or multiple beam directions and different receiver beam direction may be configured per each transmit beam direction. The pairing between TX beam and reception (RX) beam may be achieved via RACH procedure, or by UE autonomously. When RACH procedure is used, single TX beam direction may be chosen by the UE (which is generally the strongest or the best TX beam) for RACH transmission, and corresponding RACH procedure may be achieved for the chosen best beam. For additional TX beam(s), the network may trigger RACH procedure (e.g. based on non-contention RACH procedure or based on PDCCH-order triggered PRACH transmission), and beam coordination may be achieved. If UE autonomous approach is used, the network may configure a set of TX beams which needs to be maintained by the UE, as there may be possibly some control/data transmission to the given UE from those TX beams. The UE may determines RX beam for the corresponding TX beams. In terms of TX beam, in this case, the UE may use only one beam direction towards to the network to minimize coordination overhead.

After network configuration or RACH procedure to one or multiple transmit beams, the UE may maintain a list of TX and RX beam pairs.

If multiple analog beams are formed for SS block transmission, there may be multiple analog beams for one SS block. After detecting SS block, a UE may assume that the best combination of beams detected in SS block is used for control channel transmissions. In other words, until a UE is explicitly reconfigured with other CSI-RS or SS block for QCL relationship to control channel that the UE has to monitor, the UE may assume that it has QCL relationship with the best SS block detected during initial access. Also, RMSI associated with the detected SS block may configure the control resource which has QCL relationship with the detected SS block. As RMSI CORESET timing is relative to the detected SS block, implicit QCL relationship between RMSI CORESET and SS block may be determined based on monitoring periodicity, offset and window. The best combination of beams detected in SS block may be called as wide beam, which is the combination or system frame number (SFN) of multiple beams used in a SS block). As there may be multiple beams within the wide beam, it is possible that the same information are transmitted over multiple different beams. For example, if a UE knows the number of beams in a SS block and a UE detects the best beam among multiple beams within the wide beam, a UE can save power on control channel monitoring by monitoring only on those best beam(s). When the network acquires information about the best beam(s) among beams for the wide beam, the network may configure UE-specific search space (USS) and/or common search space (CSS) and/or group common search space (GSS) based on the information (i.e. define quasi-co-located channel state information reference signal (CSI-RS) resource for the control channel).

In other words, before CSI-RS configuration, a UE may be configured (implicitly) with SS block for control channel monitoring. After CSI-RS configuration, a UE may be indicated with quasi-co-located CSI-RS resource(s) for the control channel monitoring. CSI-RS configuration may be UE-specific or cell-specific. Depending on the configuration, it may be applied to CSS/USS or USS only. GSS may be categorized as UE-group which can inherit characteristics from USS and CSS as well. In other words, GSS may be configured either following CSS or USS configuration procedures.

System bandwidth indication according to an embodiment of the present invention is described. For physical broadcast channel (PBCH) reception, beam of PBCH may be associated with beam direction of SS block. Thus, the UE may receive one or multiple PBCH(s) based on the same beam direction assumption to SS block.

System bandwidth information may be carried in PBCH. Considering that future releases may support larger system bandwidth than the current maximum system bandwidth, or dynamic bandwidth change to coexist efficient with other radio access technology (RAT), or dynamic bandwidth change for energy saving, etc., it may be desirable to allow the network to change the system bandwidth without affecting UEs. To support this, the followings may be considered for system bandwidth information.

System bandwidth information may not be indicated, but transmission bandwidth or bandwidth configuration for any control/RS/data transmission configuration may be indicated. This approach may allow full flexibility, but leads significant signaling overhead. Particularly for load-balancing of paging, common channels, explicit configuration in system information (SI) may be necessary.

System bandwidth information may be indicated either from PBCH or system information (SI). The system bandwidth information may indicate default system bandwidth which is used when explicit configuration of system bandwidth is not given. Using this approach, bandwidth configuration may be additionally given. If there is one bandwidth configuration, the indicated value may be assumed. The configuration may allow future extension where a UE assumes known maximum bandwidth, if indicated value is not recognizable (e.g. bandwidth is indicated as 500 MHz but a UE can recognize up to 400 MHz). Or, the system bandwidth information may indicate maximum system bandwidth. Similar to default system bandwidth, maximum system bandwidth may be indicated.

The present invention focuses on the case that system bandwidth may not be indicated by PBCH. However, it may also be applied to the case that system bandwidth or potential system bandwidth is indicated by PBCH or system information (SI).

Configuration related to minimum SI or remaining SI (RMSI) according to an embodiment of the present invention is described. For RMSI reception, if control channel is used for system information block (SIB) transmission, a UE may attempt to read any SIB transmission with RX beam tuned for the best TX beam direction of best SS block. Alternatively, SIB may be transmitted within a SS block or similar to PBCH associated with SS block beam direction. Alternatively, beam direction may be indicated in each SIB control/data transmission resource (e.g. by using beam index or SS block index in scrambling of control and/or data) so that a UE can skip decoding on beam directions not managed by the UE. PBCH may also indicate resources where SIB is transmitted with a given TX beam direction, so a UE can attempt to read anywhere with proper receiver beam pair for the TX/RX beam pairs within the list.

In other words, the network may indicate separate resources for SIB transmission per each beam direction so that a UE can read appropriate SIB occasions. The indication may be implicit or explicit. If implicit indication is used, the same beam sequence (or scrambling based on SS block index) to PBCH and/or primary synchronization signal (PSS)/secondary synchronization signal (SSS) may be used. On the other hand, explicit indication may indicate the sequence of TX beam corresponding to PBCH and/or PSS/SSS symbol index or beam index or equivalent information. If control channel is used for SIB transmission, control channel may be located within a SS block or aligned with a SS block (i.e. multiplexing by FDM) with the same beam direction to minimize configuration overhead. For a SS block, beam direction used for SS block may be predetermined or configured by the assisting cell.

FIG. 6 shows an example of multiple SS blocks mapped in each slot according to an embodiment of the present invention. For the convenience, structure shown in FIG. 6 is assumed in the description below, for configuring RMSI related to SS block. The followings approaches may be considered. Here, association between CSS/RMSI and SS block is between association between CSS/RMSI and SS block having QCL relationship. If there are multiple SS blocks in time, multiple CSS/RMSI occasions associated with different SS block are possible.

(1) Approach 1: Time/Frequency Location of CSS for RMSI is Aligned with SS Block.

FIG. 7 shows an example of configuring RMSI according to an embodiment of the present invention. Referring to FIG. 7, control channel may be transmitted in a SS block and the beam index of control channel may be same as PSS/SSS/PBCH in the same SS block aligned at the same symbol(s).

That is, CSS for RMSI (and potentially data as well though data starting can be indicated by PDCCH) and SS block may be multiplexed by FDM. Data channel may be transmitted in the same SS block or may be scheduled by cross-slot/symbol scheduling. Generally, it is desirable to transmit data in the same SS block if possible. When data is also scheduled within a SS block duration, the duration of data transmission may be restricted, which may also affect the overall size of RMSI. Considering that small system bandwidth where SS block is located may not be able to carry other channels, the gap between control and data may be configured in PBCH as well. For example, the gap may be multiple of slots or multiple of SS block/bursts.

In this case, the necessary configuration may include at least one of the followings.

Bandwidth of CSS for RMSI (e.g. 1*SS block, 2*SS block, UE minimum bandwidth or 24, 48, 96 PRBs)

Frequency location by offset between SS block center/lowest PRB (or highest PRB) and RMSI location (e.g. lowest PRB of RMSI CSS): Offset value may be, e.g. −2*SS block, −1*SS block, 1*SS block, 2*SS block. Center may not be changed regardless of the bandwidth that a UE needs to monitor. In this case, RMSI CORESET and/or RMSI PDSCH may be scheduled around SS block where the offset value may be fixed as zero.

Numerology used for CSS for RMSI: This may be jointly configured with offset value The periodicity of CSS for RMSI: This may be same as the periodicity of SS block transmission. Or, the periodicity may be defined as a fixed value, and then, based on SS block periodicity, the number of repeated RMSI within that periodicity may vary.

CORESET duration and starting symbol: The starting symbol may be inferred from configuration of search space set configuration.

(2) Approach 2: Frequency Location CSS for RMSI is Aligned with SS Block

FIG. 8 shows another example of configuring RMSI according to an embodiment of the present invention. With this approach, SS block may have associated RMSI in the same frequency region (or around the same frequency region). The offset between SS block and RMSI may be considered. Data may also be scheduled in the same slot by avoiding SS block (which may be implicitly rate matched by the UE) or cross-slot. In other words, DCI may indicate the slot index where SS block is transmitted. The UE may avoid or assume rate matching around potential SS blocks. To minimize DCI overhead in indicating the location of PDSCH for RMSI transmission, only a few states may be used. For example, each state may represent {00: right after the first SS block after CORESET, 01: in the next slot, 10: same position to the first SS block, 11: the second next slot}. To support multiple SS blocks within a slot where multiple RMSI transmission may also be necessary, CORESET configuration may have starting symbol and duration. The followings are examples of combination of starting symbol and duration for various cases. This may be applied to Approach 3 as well, which will be described later.

Numerology for SS block and RMSI is the same (e.g. both with 15 kHz subcarrier spacing): In this case, in each slot, there are two symbols left for control region. To support up to two SS blocks in a CORESET, the following states may be configured.

>00: Starting position is 1, and the duration is 1.
>01: Starting position is 1 and the duration is 2.
>10: Starting position is 2, and the duration is 1.

>11: Starting position is 1, and the duration is 3, and CORESET is rate matched around SS block.

Numerology for SS block is half of subcarrier spacing used for RMSI (e.g. SS block with 15 kHz subcarrier spacing, RMSI with 30 kHz subcarrier spacing): In this case, there are four symbols left in every 2 slots from RMSI numerology perspective. The following states may be configured.

>00: Starting position is i with duration is 1 where is defined by the location of SS block which corresponds to the RMSI beam. For example, if a RMSI is for the first SS block in 2 slots, i=1. In other words, each symbol may be used for each SS block within two slots >01: Starting position is 1 and the duration is 2.
>10: Starting position is 3 and the duration is 2.
>11: Starting position is 1 and the duration is 3.

Subcarrier spacing for SS block is twice of that of RMSI (e.g. SS block with 30 kHz subcarrier spacing, RMSI with 15 kHz subcarrier spacing): In this case, there is only one symbol reserved for control in every 7 symbols from RMSI perspective. Thus, either mini-slot scheduling may be used, where CORESET may be configured in every 7 symbols. The following states may be configured. A UE may not be required to monitor more than one RMSI PDCCH in a slot.

>00: Starting position is 1 and the duration is 1.
>01: Starting position is 1 and the duration is 2 (where rate matched around SS block).
>10: Starting position is 8 and the duration is 1.
>11: Starting position is 8 and the duration is 2.

Subcarrier spacing for SS block is four times of that of RMSI (e.g. SS block with 240 kHz subcarrier spacing, RMSI with 60 kHz subcarrier spacing): In this case, within 5 ms where SS blocks are transmitted, CORESET may become difficult to be transmitted. Thus, it is generally desirable to transmit RMSI CORESET after SS block transmission, i.e. during period where no SS block transmission is expected. In this case, Approach 3 described below may be more appropriate. The slot offset where CORESET can be transmitted may be signaled by PBCH corresponding to the beam. Alternatively, the position where SS block CORESET can be transmitted may be implicitly determined based on SS block index or the position of SS block. Alternatively, RMSI CORESET may be aligned with SS block.

(3) Approach 3: Frequency Location CSS for RMSI is not Aligned with SS Block

FIG. 9 shows another example of configuring RMSI according to an embodiment of the present invention. This approach is the most flexible approach, which indicates CSS location within a system bandwidth. As the bandwidth can be very large, the location of CSS for RMSI may not be very far from SS block or restricted candidates may be supported. For example, multiple of synchronization raster may be used for indicating offset between SS block and CSS for RMSI. If this approach is used, as multiple SS blocks can share CSS for RMSI, the PRB indexing and scrambling should be understood commonly between UEs accessing different SS blocks. Thus, to make this effective, a common reference point, such as center frequency, needs to be first indicated, and then, the offset from the center may be used.

Alternatively, local PRB indexing may be used within CSS for RMSI. In this case, regardless of multiple SS blocks, PRB indexing may be localized within CSS for RMSI. The same principle may also be applied to data for RMSI transmission. PRB grid structure between PBCH and RMSI may be aligned. At least, subcarrier spacing grids may be aligned. If channel raster or synchronization raster is not multiple of subcarrier spacing, PRB-grid-offset may be indicated for RMSI, and the offset may be used to align PRB grid of RMSI transmission to the rest of system bandwidth. For example, if synchronization raster is 100 kHz, PRB-grid-offset may be 80 or −20 kHz.

This approach may be summarized as follows.

PBCH may indicate offset between SS block and center frequency, and RMSI frequency location (or between lowest PRB subcarrier 0 locations of two) may be given by offset between center and CSS. PRB indexing and scrambling within RMSI CSS/data region may follow global indexing.

PBCH may indicate only offset between SS block and CSS for RMSI. PRB indexing may be localized for CSS for RMSI.

(4) Approach 3-1: Frequency Location of CSS is not Aligned with SS Block, but RMSI Location is Aligned with SS Block in Terms of Time FIG. 10 shows another example of configuring RMSI according to an embodiment of the present invention. For example, CORESET may be configured in a first few symbols in each slot where PDSCH containing RMSI can be scheduled aligned with SS block. When there are two SS blocks in a slot, 1 or 2 may be indicated to indicate whether the first SS block or second SS block is used for timing information. For this, the location of CORESET may be indicated with starting symbol relative to the start of slot or relative to SS block, and the location of PDSCH may be dynamically indicated among potential set of SS blocks in a slot.

The duration of data may be aligned with SS block (e.g. 4 symbols or 2 symbols depending on numerology) or may be expanded to 6 symbols (or 3 symbols depending on numerology) to utilize remaining symbols.

In summary, the possible location of CORESET for RMSI may be represented by one of the followings.

Relative symbols from the start of slot
Relative symbols from the SS block

Furthermore, the location of PDSCH for RMSI may be represented by one of the followings.

SS block index within a slot: When this is used, the duration may be same as SS block duration
Symbol index within a slot
Slot index When each approach described above is used, the following approaches may be considered for the handling of beam index.

(1) Approach 1: Beam Indication May be Implicit.

FIG. 11 shows an example of handling of beam index according to an embodiment of the present invention. Referring to FIG. 11, RMSI beam index is aligned with SS block. PBCH with one beam direction may indicate/configure information for CORESET with potentially monitoring interval for SIB reading (at first, RMSI) with the same beam direction. A UE may access RMSI for the same beam direction based on configuration from PBCH. If this is used, each PBCH may deliver different information, as such accumulation among different PBCHs may not be easily doable. Another approach to allow accumulation is to configure only frequency information, periodicity of control channel monitoring, and control region size in time (e.g. duration), so that each control may carry beam ID information from the RMSI transmission. Or, if RMSI or control channel for RMSI is transmitted within SS block, time or SS block index where RMSI information can be found may be determined implicitly.

(2) Approach 2: Control Channel is Transmitted Independently from SS Block.

FIG. 12 shows another example of handling of beam index according to an embodiment of the present invention. Referring to FIG. 12, Each PBCH may inform CORESET associated with the same beam to PBCH, so that a UE can acquire multiple CORESETs by reading multiple PBCHs, if the UE can access multiple PBCHs. To read one or multiple of such beams for RMSI reading may be up to the UE. Data scheduling for this approach may follow regular data transmission approach, where starting/ending of data transmission may be indicated dynamically from DCI. If this approach is used, PBCH may need to indicate CORESET in symbol level if control regions are beam-swept.

FIG. 13 shows another example of handling of beam index according to an embodiment of the present invention. Referring to FIG. 13, PBCH may inform a set CORESETs for RMSI reading. A UE may assume that beam sweeping in such configured source occurs, and the UE may read corresponding control/data based on beam index acquired in PSS/SSS/PBCH readings. To reduce potentially UE blind decoding, one approach is to configure implicit mapping between SS block to CSS for RMSI. For example, SS block index indicated from PBCH may be an index where RMSI control for the corresponding beam is transmitted during the configured CORESET duration assuming a fixed size of control resource region per each beam (e.g. 1 or 2 symbols). In other words, implicit mapping between SS block and RMSI's control resource for a beam may be assumed. Similar relationship may also be possible between RMSI's control resource (or data resource) and other SI or RAR control resource set. In an example of resource configuration, maximum window may be configured and RMSI corresponding to the SS block after the actually transmitted SS block may be indicated.

In actual configuration, the following information may be considered.
  Frequency location of CORESET for RMSI
  Periodicity of control monitoring interval: This may be configured in terms of SS or CORESET. If not defined, same periodicity of PBCH transmission may be used for RMSI.
  PRB bundling size or the bandwidth of wideband RS if wideband RS is used
  Scrambling ID (if not configured, cell ID and/or beam index may be used)
  Numerology used for RMSI control and/or data (jointly or separately)
  Control region size in time (if beam sweeping is used particularly)
  Bandwidth for data, if data is mapped wider than CORESET: If this is not present, data bandwidth (or bandwidth part (BWP) for RMSI PDSCH) may be equal to the bandwidth of CORESET.

To minimize signaling overhead in PBCH, the following approaches may be considered.
  (1) Joint encoding of information
  (2) To reduce candidates of frequency location, only a few offset values (e.g. 0: same as SS block, 1: +100 RB, −100 RB, no RMSI associated with this SS block) may be used. Alternatively, only a few offset values based on (K*synchronization raster) may be used.
  (3) To reduce candidates of time location for RMSI control/data monitoring for a given SS block, monitoring may be performed only in slots where no potential SS block is assumed. Alternatively, assuming SS block periodicity as monitoring periodicity for RMSI, offset value or window value may be assigned. Offset value may be selected for slots which does not include any potential SS block. Alternatively, a predefined set of slots where RMSI can be monitored which also has periodicity may be defined. This set of slots may be configured in PBCH. For example, to minimize UE blind detection burden, maximum slots to monitor RMSI for a given SS block may be configured similar to RAR window. The UE may be indicated with one from the set for each associated SS block.
  (4) To reduce candidates of bandwidth for CSS for RMSI and data for RMSI, 1 bit indication may be used. For example, a value of 0 may mean same as SS block, and a value of 1 may mean same as UE minimum bandwidth. Alternatively, a restricted set of bandwidths may be indicated.

Generally, data transmission or control transmission which may require beam sweeping over multiple beams may be placed within a SS block. Examples of such cases include SIB transmission, control channel transmission for paging, paging transmission, common signal transmission, etc. Similarly, for UL, PRACH resource may be used for the same purpose and a UE may sweep multiple beams at the configured PRACH resources where other transmissions and PRACH may be multiplexed by FDM.

In terms of location of CORESET, and potentially scheduling of RMSI, the followings may be considered.
  (1) Starting symbol for CORESET may be as follows.
    First symbol of a slot (in normal cases)
    In symbols such as 2nd symbol or 3rd symbol (e.g. in case of LTE-NR coexistence)
    In the first symbol of SS block (1st or 2nd SS block in a slot)
    In symbol such as 8th symbol (e.g. in case of mini-slot support for RMSI CORESET)
    In OFDM symbols such as 2nd, 3rd, 4th symbol (e.g. in case of beam sweeping of multi-beam)
  (2) Duration of CORESET may be as follows.
    1-3 symbols for normal case
    1 symbol for beam sweeping case
  (3) Number of CORESETs configured in PBCH may be as follows.
    One per slot
    Two per slots (e.g. RMSI per each SS block)
    More than two per slot with cross-slot scheduling
    At least one or two CORESETs per slot: When multiple CORESETs are configured, the same configuration may be applied, except for starting symbol of each CORESET. CORESET configuration may configure only frequency & duration related information, and starting locations may be configured in search space configuration.
  (4) RMSI PDSCH duration may be as follows.
    Same as SS block duration
    One slot
    Fixed size (such as 12 symbols)
    Multiple slots
    Similar to other data, time domain information may also be scheduled by DCI.
  (5) Gap between PDCH and PDSCH for RMSI transmission may be as follows.
    Variable (1st SS block or 2nd SS block for PDSCH TX)
    Cross-slot (Slot duration where starting symbol can be same as the maximum CORESET duration for RMSI in the current slot)
  (6) If multi-slot is used, the number of slots may be fixed (e.g. 4) and 1 bit indication whether multi-slot is used or not may be indicated. Alternatively, DCI fields may have multi-slot scheduling, at least in some cases (e.g. below 6 GHz)

To support the above description, the followings may be necessary configurations of PBCH and DCI for resource allocation for RMSI. First, PBCH contents may include the followings.

(1) Frequency location and bandwidth: 2 bits
  1) Center may be same as SS block+SS block bandwidth (in RBs)
  2) Upper of SS block+2*SS block bandwidth
  3) Below of SS block+2*SS block bandwidth
  4) Center may be same as SS block+UE minimum bandwidth (in RBs)

(2) Time location and duration
  For the first set of CORESET, the starting symbols may be represented by 2 bits, which indicates one of 1) 1st symbol, 2) Same as 1st SS block, 3) Same as 2nd SS block, or 4) 3rd symbol.
  Different table may be used between below 6 GHz and above 6 GHz. For example, for below 6 GHz, the starting symbols may be represented by 2 bits, which indicates one of 1) 1st symbol, 2) 3rd symbol, 3) 4th symbol, or 4) Same as 1st SS block.
  For the second set of CORESET which may be present only in above 6 GHz (or both), the starting symbols may be represented by 1 bit, which indicate one of 1) after 1st CORESET, or 2) 8th symbol.
  For duration, 1 bit may indicate one of 1) 1 symbol, or 2) 2 symbols. Alternatively, this information may be jointly signaled with bandwidth. For smaller bandwidth, 1 bit may indicate 2 or 3 symbols, and for larger bandwidth, 1 bit may indicate 1 or 2 symbols.

(3) Monitoring window: 1 bit
  1) 1 slot
  2) 4 slots

Alternatively, monitoring window may be different in below and above 6 GHz. For example, for below 6 GHz, 1 or 4 slots may be indicated, and for above 6 GHz, 2 or 8 slots may be indicated.

Second, DCI contents may include the followings.

(1) Frequency resource allocation: Resource allocation (RA) field size may be determined based on the bandwidth of initial DL BWP or max (initial DL BWP, initial UL BWP).

(2) Time resource allocation: 3 bits
  1) Same as 1st SS block (starting and duration) in the slot
  2) Same as 2nd SS block (starting and duration) in the slot
  3) Starts at the starting symbol of scheduling CORESET, and ends in the end of slot
  4) Starts after the scheduling CORESET, and ends in the end of slot
  5) Starts after the maximum duration of CORESET(s) in the next slot, and end in the end of the next slot
  6) Starts after the scheduling CORESET or maximum duration of CORESET(s), and ends in the end of next Kth slot (K repetition of RMSI). K may be configured differently per frequency range (e.g. K=4 for below 6 GHz, and K=8 for above 6 GHz).
  7) Starts at the starting symbol of scheduling CORESET, and ends in 7th or 14th symbol depending on where scheduling occurs (or the duration is fixed as 7 or 4 symbols)
  8) Stars after the maximum duration of CORESET(s), and ends in 7th or 14th symbol depending on where scheduling occurs (or the duration is fixed as 7 or 4 symbols)

Different table entries may be considered for different frequency ranges or depending on the number of SS blocks. Or, multiple tables may be specified in the specification, and one table may be selected by PBCH indication.

Paging related configuration according to an embodiment of the present invention is described. When system bandwidth is not indicated, still, there may be a necessity that paging should be able to be delivered by multiple subbands in wideband carrier. For this, implicit subband may be constructed for paging delivery where multiple subbands are configured based on SS block size around SS block. This may be worked when RMSI belongs to only one SS block.

If RMSI is shared by multiple SS blocks, this may require common reference. Thus, it may be desirable that at least RMSI indicates a common reference, then paging location may be indicated based on the common reference.

Other SIB reception according to an embodiment of the present invention is described. After reading RMSI, in terms of reading other SIB, CORESET configuration may be as follows.

(1) Approach 1: Separate CORESET for Other SIB May be Used.

FIG. 14 shows an example of other SIB reception according to an embodiment of the present invention. Referring to FIG. 14, separate CORESET for other SIB from CORESET for RMSI may be used. Particularly, when different numerology is used between RMSI (which uses the same numerology as PBCH) and other SI (which uses the same numerology as typical data/control). In this case, similar approach to configure CORESET for RMSI may be considered and actual configuration may be done from RMSI instead of PBCH. For example, separate CORESET configuration per each beam direction may be given by RMSI for specific beam. The drawback of this approach is that a UE needs to acquire multiple RMSI to acquire CORESET information for multiple beams. Another approach may be to indicate common beam sweeping CORESET shared by multiple beams. If different CORESET is used for other SI from RMSI, depending on UE bandwidth capability, a UE may need to retune its frequency. Similar to RMSI, thus, when separate configuration is used, either bandwidth for data may be same as CORESET or explicit configuration of data bandwidth may configured.

Receiver direct current (DC) subcarrier may on the center of maximum bandwidth (control bandwidth, data bandwidth) or center of system bandwidth. In other words, if a UE supports narrower bandwidth than system bandwidth, center of RX RF may be at the center of currently received control/data, and if the UE supports the same bandwidth to system bandwidth, the center of system bandwidth may be used for the receiver DC subcarrier. Actual receiver DC subcarrier may be different. This is for the assumption to handle receiver DC subcarrier, e.g. to avoid demodulation RS (DM-RS) mapping. In other words, at the center of control/data of RMSI/other SI transmission may not be mapped with DM-RS. Thus, it may be desirable that center of control/data, or the gap between center frequency to the center of control/data should be multiple of RBs based on the numerology used for either RMSI or other SI transmission (or larger subcarrier spacing of two or multiple).

FIG. 15 shows an example of other SIB reception according to an embodiment of the present invention. In terms of UE bandwidth, a UE may increase or retune its frequency to different frequency depending on its RF capability and measurement setting. For handling the measurement, it may be considered to have explicit subbands based on the minimum UE bandwidth, and configure CORESET aligned with that subband. Referring to FIG. 15, measurement RS may be transmitted across system bandwidth and a UE may measure partial bandwidth depending on its capability, if a UE needs to perform measurement during initial access. As a UE needs to perform measurement based on SS block initially, necessary SS block may be transmitted in each subband, and RMSI/other SI may be transmitted only in one of subband. If this approach is used, center of anchor subband where RMSI/other SI is transmitted may be indicated as well.

(2) Approach 2: The same CORESET for RMSI may be used for other SI as well. If there is no configuration in RMSI, the same CORESET for RMSI may also be used for CORESET for other SI. If different DCI sizes are used for RMSI and other SI transmissions, it may be further considered to configure at least periodicity of monitoring CORESET/search space for other SI transmission, which may be different from control monitoring for RMSI.

RAR reception according to an embodiment of the present invention is described.

RAR may be accessed before other SI depending on the procedure. The mechanisms for other SI may also be applicable for RAR. When channel reciprocity is used, PRACH for the best TX beam may be chosen and transmitted. The UE may expect RAR reception from the best TX beam. Otherwise, PRACH for possibly best beam may be chosen and transmitted along with the best TX beam indication in the message. Once the network receives best TX beam, the network may transmit RAR using the reported best TX beam. The beam pairs for Msg 3/4 may be further indicated via dynamic singling or configured by SIB.

Overall, until reconfigured or indicated otherwise via dynamic signaling, a UE may assume that selected beam pairs from initial access may be used for common control message transmission. Based on radio link management (RLM) or beam management measurement, it is however possible that the UE may switch its beam to the best beam. For example, when RLM is performed across multiple SS blocks, the best beam may be selected and the UE may use the selected best beam for CSS reception. When the UE switches its best beam, the beam may be indicated to the network so that the network may also reconfigure CSI-RS configurations according to the best beam. However, for RAR reception, unless indicated in PRACH transmission, the beam selected for PRACH transmission may be used for RAR reception. As corresponding messages such as Msg 4 may also use the same CSS with the same beam direction, the UE may indicate the change of the best beam (if any) in Msg 3 transmission. Otherwise, the same beam direction searched through initial access may be used for RACH procedure.

Furthermore, common data may also be transmitted using one of selected beam pairs from the initial access. When it is transmitted, information of beam direction needs to be known to UE so that a UE can acquire proper synchronization and so on for control/data reception. Also, for RS, the same beam direction may be used for RS transmission. In this sense, for a shared RS, QCL relationship to one of beam direction may be assumed with respect to arrival angle, received timing, average delay, etc. This may also be true for other control search space (e.g. CSS for RMSI, CSS for other SI). In other words, before CSI-RS configuration, QCL relationship may be given referencing to SS block (explicitly or implicitly). When implicit mechanism is used, it may be associated with the PRACH and the beam for DL and UL may be determined by the beam chosen for PRACH transmission. When explicit configuration is given, beam index or SS block index may be used. When implicit configuration is given, CORESET may be related to each SS block. Only a few properties for QCL may be assumed (e.g. average delay and arrival angle).

For control channel for common data, QCL relationship to some beam direction may also be assumed. This common control channel may be used for radio link failure (RLF). If a UE is configured with more than one beam direction for common control channel receptions, RLF may be performed also on more than one beam direction. To minimize the overhead of a UE RLF measurement, only the primary beam direction may be used for RLF which may be separately configured or indicated in control channel configuration. Similarly, it is possible that only one or subset of TX/RX beam pairs from the list may be further configured for control channel monitoring for overhead reduction. The list may be used for beam management purpose only, in which case, RLF may be performed on the configured primary beam pairs and beam management procedure may be performed prior to the RLF handling.

Operation after CSI-RS configuration according to an embodiment of the present invention is described. Based on some beam RS or some other means, finer or different beam directions may be configured to a UE during RACH procedure or after RACH procedure via RRC configuration (or equivalent procedure). When CSI-RS configuration is given, QCL relationship to a beam direction with respect to at least average delay may be configured per each CSI-RS. This is necessary particularly to determine RX beam pair to receive CSI-RS resource properly. However, if QCL relationship is not given, additional TX/RX beam pairing procedure for CSI-RS may be further considered and a UE may assume time/frequency tracking based on measurement and synchronization signals from the serving cell, and maintain TX/RX beam pairs for the configured CSI-RS resource sets in addition to TX/RX beam pairs for possibly shared RS based control channels or control channel based on initial beam directions. In terms of QCL configuration, the beam direction, and properties of QCL relationship (e.g. average delay only, average delay+arrival angle, etc.) may be configured. CSI-RS may be transmitted in the same symbol where control is transmitted as long as control channel and CSI-RS can have QCL relationship (i.e. from the same beam direction). The followings may be considered.

- A UE specific RS and/or USS may be configured with beam direction aligned with one of configured CSI-RS configuration. In other words, UE-specific RS and/or USS may be configured with CSI-RS resource index to indicate the beam direction used for control/RS transmission. In other words, for a USS, QCL relationship to CSI-RS resource may be indicated.
- Shared RS and/or GSS or CSS may be configured with beam direction aligned with one of configured CSI-RS configuration. This may be particularly necessary when resource set is shared between CSS and USS. Alternatively, if CSS and USS are separately configured or resource set for each is configured independently, CSS may be QCL-ed with one of SS block and USS may be QCL-ed with one of CSI-RS. If this is used, RLM measurement may occur for CSS monitoring, not for USS monitoring. RLM may occur based on RS and/or channel transmission carried in SS block. When multiple beams are configured for CSS and/or USS, different configuration or indication may be necessary if different mechanisms are used. If multiple beams are configured for CSS and CSS is QCL-ed with SS block, one or more of SS block indices may be configured to be monitored, and for USS, one or more of CSI-RS resources may be indicated.

Shared RS may also be configured with QCL relationship to CSI-RS resource for USS. Shared RS may be configured with QCL relationship to beam direction even for USS.

Based on QCL relationship to beam direction of initial signals, shared RS for USS may be shared even for CSS.

To support RLF, and other operations well, it may be desirable to configure CSI-RS resource which is QCL-ed with one of beam direction. If not, measurements on common channel may be based on beam refinement/RS.

Beam direction may be associated only to initial cell CSS (e.g. for RAR, Msg 4 scheduling), and GSS, which is associated with one of CSI-RS resource index instead of beam index, may be configured. This may also be applied to cell CSS as well.

Hereinafter, various aspects of control channel are proposed according to embodiments of the present invention.

1. Search Space Configuration with Bandwidth Adaptation

UE-specific bandwidth where a UE monitors all DL or UL may be called as UBW (DL UBW or UL UBW, respectively). Here, DL UBW may be focused on, mainly for control resource set configurations. In terms of UBW reconfiguration, the following cases may be considered.

Case 1: New UBW is not overlapped with old UBW
Case 2: New UBW is larger than old UBW and new UBW totally includes old UBW
Case 3: New UBW is larger than old UBW and new UBW partially includes old UBW
Case 4: New UBW is smaller than old UBW and old UBW totally includes new UBW
Case 5: New UBW is smaller than old UBW and old UBW partially includes new UBW When bandwidth adaptation or frequency region is changed for a UE, reconfiguration of search space and/or control resource sets may also be necessary. During reconfiguration period, fallback mechanism to avoid unnecessarily service interruption time needs to be considered. Reconfiguration may done by higher layer signaling, media access control (MAC) control element (CE) or L1 signaling. The following approaches may be considered.

(1) Approach 1: Seamless Handover Like Procedure

Similar to seamless handover, control/data transmission from old UBW and new UBW may coexist until the network is assured that reconfiguration is completed. When new UBW is overlapped with old UBW partially or fully, this approach may not work effectively. To mitigate this issue, new UBW may always not be overlapped with old UBW. Or, if new UBW is overlapped with old UBW, at least one CORESET or search space may be maintained unchanged so that a UE can obtain control from it. It may be desirable that new UBW should include the bandwidth which contains the bandwidth of unchanged CORESET or search space.

(2) Approach 2: Effective Time is Indicated in Reconfiguration Message

Alternatively, effective time where reconfiguration may become effective may be indicated. Effective time or the gap between the current time and effective time may be sufficiently large to allow multiple retransmissions of indication messages. Effective time may be given as a gap or offset between indication message to the effective time in terms of slots or mini-slots.

When reconfiguration messages are given by L1 signaling, acknowledgement (ACK) may be informed. Also, particularly for UL UBW change, L1 signaling may be used to change UE's bandwidth explicitly indicating in UL grant, particularly when there is a gap between control and PUSCH sufficiently to absorb retuning latency. It may also be considered for DL. The drawback of this approach is that UL UBW for PUCCH or other non-PUSCH channel may become ambiguous, particularly when UL grant is missed or no UL grant is transmitted. Thus, generally, similar mechanism in both DL and UL UBW adaptation may be assumed. Also, for unpaired spectrum operation, it may also be beneficial to assume the same UBW for DL and UL. Or, if the bandwidth is different, at least center frequency may be the same.

(3) Approach 3: Timer Runs and when Timer Expires, New Configuration Becomes Effective Alternatively, whenever reconfiguration message is received, a UE may start a timer (new-conf-effective-timer), which may be reset at retransmission of reconfiguration message or new reconfiguration message. If the UE does not receive any reconfiguration message until the time expires, the UE may assume that the configuration becomes effective. For example, when using MAC CE, timer value may be set as 8 TTIs. If HARQ-ACK is received within 8 TTIs, the new configuration may become effective after 8 TTIs. If the network does not receive HARQ-ACK, the network may retransmit the reconfiguration message and the UE may reset the timer. A new timer for bandwidth adaptation may be used if the network configures multiple bandwidth configurations or configures the UE to adapt its bandwidth.

(4) Approach 4: Rely on UE Blind Detection

Alternatively, the UE may perform blind decoding on multiple possibilities (e.g. old and new UBW).

Bandwidth adaptation may not occur during cross-slot scheduling (e.g. between control and its corresponding data). If bandwidth adaptation occurs within the gap between control and data (including UL and DL), a UE may drop its transmission or reception. Similar issue may also be applied for multi-slot scheduling. In other words, if a UE detects bandwidth adaptation during receiving or transmitting data, the UE may stop its reception or transmission. Alternatively, a UE may not be expected to be configured with bandwidth adaptation during data reception or transmission. If this is used, a UE may skip decoding on L1 signaling for bandwidth adaptation, if necessary, during data reception or transmission. Or, if timer based approach is used, the new configuration may become effective after completion of reception or transmission. Multiplexing control/data within SS block may be configured.

For SS block configuration, starting symbol within a slot may be configured, and may be different depending on the slot size. If slot size is 7, only one SS block may be placed within a slot. If slot size is 14, maximum 3 SS blocks may be placed within a slot. It is also possible that different numerology may be used for SS block compared to data transmission. This is based on the assumption the same numerology is used between data and SS block. If different numerology is used, the same numerology may be used for transmissions used/occurred within the SS block. In other words, the same numerology may be used within the SS block. If one slot is not sufficient for SS block, instead of continuing to the next slot, some gap between SS block slots may be configured (e.g. 1 slot). This is to allow UL transmission with reasonable latency. Alternatively, by reducing the number of SS blocks in a slot, flexible portions which may be used either DL or UL may also be considered.

A case that numerology for data is 15 kHz subcarrier spacing, and numerology for SS block is 30 kHz subcarrier spacing (or numerology for data is 60 kHz subcarrier spacing, and numerology for SS block is 120 kHz subcarrier spacing, or any case where numerology of SS block is twice of numerology of data) may be assumed. In this case, slot size may be 7 symbols. In this case, 3 SS blocks may be placed in each slot and one symbol may be left for control region (either DL or UL). Or, slot size may 14 symbols. In this case, 7 SS blocks may be placed in each slot without reserving any symbol. To leave some control region, smaller SS block may be placed. Assuming two symbols for DL control, and 1 symbols for UL control with guard period (GP), 5 SS blocks may be placed in each slot.

A case that numerology for data is 30 kHz subcarrier spacing, and numerology for SS block is 15 kHz subcarrier spacing (or numerology for data is 120 kHz subcarrier spacing, and numerology for SS block is 60 kHz subcarrier spacing, or any case where numerology of SS block is half of numerology of data) may be assumed. In this case, slot size may be 14 symbols. In this case, 1 SS block may be placed in each data slot and one symbol based on 15 kHz subcarrier spacing may be left in the beginning and end of 7 symbols of 15 kHz subcarrier spacing for control. This may be applied when slot size is 7 symbols.

The subcarrier spacing or numerology for data may be one of a default data numerology (fixed in specification per frequency region), numerology for RMSI transmission (control and/or data), numerology for PRACH, numerology for RAR, or numerology for USS.

When CORESET duration is larger than the symbol reserved by SS block, if the SS block is activated (i.e. transmission occurs), control may be rate matched around SS block resource. Rate matching may be performed only on the overlapped resource assuming that beam is handled by the network scheduling.

Alternatively, rate matching may be performed on the entire symbols of SS block resource. In this case, the entire symbols are reserved, and resource element group (REG) mapping may not occur in the reserved symbol. Generally, REG mapping may not occur in the reserved symbols, and SS block resource may also be reserved. For example, if REG bundling over time domain may be the same as CORESET duration, depending on the number of reserved symbols, it may be smaller. For example, when CORSET duration is 3 symbols, and 3rd symbol is used for SS block, REG bundling may occur over 2 symbols instead of 3 symbols. In other words, CORESET duration may change in each slot depending on whether there is active SS block or not depending on the resource of SS block. When time domain REG bundling size is changed, the size of frequency domain bundling size may be changed as well. In other words, REGs may not be formed in symbol which is reserved or rate matched due to SS block or other reason. In that case, the effective duration of CORESET may be reduced compared to the configured duration. Alternatively, REGs may be formed in symbol which will be rate matched, but candidates overlapping with rate matched REGs may not be monitored. In case of time-first mapping, this may lead all candidates are not monitored, which means that CORESET becomes ineffective in such cases. Another approach is to rate matched around reserved or SS block only for REGs without changing REG-control channel element (CCE) mapping or REG bundle size. In other words, when rate matching occurs, effective number of REGs per CCE may be reduced.

Whether to apply rate matching on the entire symbols or only around the SS block may depend on whether the same beam is used between data and SS block. To determine whether the same beam is used between data and SS block, a UE may determine based on beam direction or it may be indicated in DCI. Alternatively, for cell-common PDSCH, rate matching may be applied only around SS block assuming that the same beam is used between PDSCH and SS block. For USS PDSCH rate matching may be applied on entire symbol.

Which option for rate matching is used may be configured depending on beam configuration. It may be same between SS block and CORESET or not or depending on frequency range. Furthermore, different rate matching option may be used per frequency range (e.g. first approach for below 1 GHz, second approach for above 6 GHz).

SS block for data rate matching may be different from SS block the UE accessed or is accessing. Also, if there are multiple SS blocks in the system bandwidth, a UE may be indicated with a list of SS blocks and its associated periodicity (and/or time/frequency resources). Based on the information, each UE may perform appropriate rate matching on each SS block. This may also be implemented by UE-specific reserved resource configuration and different SS blocks can be indicated for rate matching. If the entire symbols needs to be rate matched, the reserved resource may be configured to be the entire symbols.

Similar rate matching may also be applied to data transmission as well. Furthermore, if there is configurability for rate matching option, in the same symbol, the same rate matching may be applied within BWP. In other words, different configuration may be considered per BWP, but the same configuration may be used within BWP. More generally, a set of reserved resource configurations may be differently configured per configured BWP. Depending on the activated BWP, a UE may apply different set of reserved resource configurations. This may also be applied to dynamically indicated reserved resources where the set of reserved resources (which is dynamically indicated) are semi-statically configured per each BWP (joint configuration among multiple BWPs may also be considered).

More generally, it may also be applied to reserved resource configurations. Reserved resource may be configured in time and frequency resources and rate matching may occur in symbol level. Furthermore, if numerology for SS block is different from numerology of CORESET/data, reserved resource configuration may be given by SS block numerology which will then be interpreted accordingly for data numerology. For example, if SS block numerology is 15 kHz subcarrier spacing and CORESET/data numerology is 30 kHz subcarrier spacing, one reserved symbol may correspond to 2 symbols of data. The symbol location may be determined based on symbol level alignment based on 15 kHz subcarrier spacing. Particularly, if SS block and data numerology are different, to allow UE measurement on SS block without supporting multiple numerologies, the entire symbols may be rate matched. Assuming that some UEs may not support both numerologies simultaneously, symbol level rate matching may be applied for UE-group or cell-specific CORESET/data transmission without configuration.

Even if the numerology is the same, at least when beam forming is used, entire symbols may be rate matched for common control/data. If configurability is given, it may be configured from SI. Thus, at least for RMSI, default behavior may be assumed to be rate matched on entire symbols of SS block either for CORESET or data. Alternatively, default behavior may be set as rate matching on the resource.

When multiple SS blocks are transmitted by the network, at least for SS blocks identifiable by stand-alone or RRC-IDLE UEs, the periodicity and beam index used in the same symbol in a slot may be same across multiple SS blocks. Also, the location in terms of symbol for SS block in each location may be same.

In terms of multiplexing SS block with data, the following options may be considered.

(1) No multiplexing of data and SS block: Other than control channel, data may not be transmitted over a slot containing SS block. In this case, SS block may be used for tracking RS transmission or RLF-RS transmission. Or, SS block may be used for radio resource management (RRM) measurement or CSI-RS transmission.

(2) Multiplexing of data, which for cell common broadcast, and SS block: The size of data transmission may be indicated by DCI or may be aligned with the SS block size. As tracking RS and/or CSI-RS can be transmitted with different beam direction, periodic tracking RS and/or CSI-RS transmission may be configured to be aligned with SS block. Thus, indication of size of data may be necessary or cross-slot scheduling may be used if control is received aligned with SS block. In this case, the same data may be transmitted across multiple beam directions. However, it is possible that different TRPs transmits different data. In this case, whether a UE can aggregate multiple repetitions or not may be indicated explicitly. The information may be same to the PSS/SSS/PBCH. In other words, a group of SS blocks from the same TRP may be indicated to UEs so that some UEs can attempt to aggregate multiple repetitions from different beam directions.

(3) Multiplexing of data can be possible via scheduling: A UE may expect to receive a control channel which has QCL relationship to the SS block, and monitors control channel which schedules data transmission. The size of data transmission may be indicated by DCI or may be aligned with the SS block size. As tracking RS and/or CSI-RS can be transmitted with different beam direction, periodic tracking RS and/or CSI-RS transmission may be configured to be aligned with SS block. Thus, indication of size of data may be necessary or cross-slot scheduling may be used if control is received aligned with SS block. To support this, a UE needs to know TX beam used in each SS block which may be the same or may be indicated in PBCH and/or SIB, and/or whether the beam sequence has been changed so that the UE has to either blindly search or the sequence may be updated via SIB transmission or UE-specific signaling.

Though depending on the network configuration, the network may choose different options, from a UE perspective, whether to monitor control channel or not needs to be informed. It may be configured by the network to indicate whether control channel can be transmitted in each SS block which has QCL relationship with PSS/SSS/PBCH for the given SS block. If the indication is given in either PBCH or SIB or UE-specific signaling, a UE may monitor control channel corresponding to the configured beam directions for control channel monitoring for potential data scheduling. Furthermore, any RS transmission may be configured, which may be aligned with SS block by the configuration. Whether it is aligned with SS block or not may be transparent to UEs. When a UE is indicated with control channel transmission or potential multiplexing of data in a SS block, a UE may monitor such control occasions in addition to its scheduled control monitoring occasions. For this additional control monitoring, different resource set and/or search space may be configured from regular control channel monitoring case. Also, the number of blind decoding candidates to monitor may be separately configured.

2. RLF

RLF is used to indicate the status whether the UE can receive control channel successfully or not based on link quality monitoring. In LTE, RLF is monitored based on cell-specific RS (CRS) for control channel on PDCCH. In NR, it is expected that multiple search spaces are configured (e.g. CSS for RAR reception, CSS for paging reception, GSS, USS, etc.). Without shared search space between different control channels, it is necessary to define how to measure RLF. The following are potential candidate RSs.

(1) Signal to Noise and Interference Ratio (SINR)/Channel Quality Measurement RS Shared RS used for CSS or GSS may be used for RLF.
Measurement RS used for measurement may be used for RLF.
Synchronization signals such as PSS/SSS may be used for RLF.
CSI-RS (indicated/configured for RLF) may be used for RLF. This may also be shared with RRM measurement
Beam measurement RS may be used for RLF.
UE-specific or shared DM-RS for USS may be used for RLF
Dedicated RS may be used for RLF.
RS used for control channel may be used for RLF.
Cell or group-common tracking RS may be used for RLF. This may be transmitted at least periodically.
Cell or group-common RS which are transmitted at least periodically may be used for RLF.

For example, for tracking and/or measurement and/or feedback purpose, cell common or group common RS may be transmitted. Such RS may be used for RLF. The periodic RS may be transmitted only in primary cell (PCell) or cell where CSS or GSS is configured. For other cell/carrier, this RS may be omitted, and RS transmitted from PCell may be used for tracking on other cell/carrier.

Even though shared RS for a search space is used for RLF, it is possible that the RS may be transmitted only if there are scheduling on that search space. In such case, measurement on RLF can be as follows.

Opportunistic RLF: RLF may be measured only at the occasions where the RS has been transmitted (while UE is not in discontinuous reception (DRX)). More particularly, this type of operation may be used for secondary cell if the search space for RLF measurement is configured.

Periodic RLF measurement: Regardless of actual scheduling, periodic transmission of RLF measurement RS may be guaranteed. Time/frequency resources for this type of RS may be separately configured from search space RS configuration.

One-shot or aperiodic RLF measurement: RLF may be performed by triggering and the network may transmit RS for RLF once it has been triggered. One simple approach is to transmit RLF triggering message on the search space assumed for RLF measurement.

Multi-shot or semi-persistent RLF measurement: Similar to semi-static CSI measurement, multi-shot or semi-persistent RLF measurement may also be configured and activation/deactivation of RLF measurement may be enabled via dynamic signaling.

Shared RS may be called as wideband RS. Wideband RS may be defined as a RS used for control channel demodulation which will be present over wideband regardless of actual mapping of control. Wideband RS may be present at least when there is one control channel or following configuration for CSS CORESET. The wideband RS may be transmitted over CORESET bandwidth or system bandwidth or UE-specific bandwidth or the carrier bandwidth a UE is configured with. Alternatively, it may be separately configured with the bandwidth of wideband RS transmission along with periodicity.

For example, when CSI-RS or SS blocks are used for RLM measurement (which may be periodic signal), whether slot formation indicator (SFI) via group common PDCCH may cancel the measurement needs to be a bit more clarified. If SFI can validate or invalidate the RLM CSI-RS transmission, and if the UE cannot perform measurement, the UE may use previous measurement so that in-sync and out-of-sync can be still updated. The timer may be running regardless of whether the UE is able to perform measurement or not. If the UE cannot perform measurements, timer may stop until the next measurement occasion. This is to avoid unnecessarily out-of-sync or in-sync timer expiration. The UE can skip measurement when this approach is used. In other words, when the measurement is not done, timer may be delayed in terms of resetting or expiration or running. This behavior may be configurable. To avoid this, another approach is to assume that RLM CSI-RS is transmitted only in semi-statically DL resources, whereas other resources are ignored for RLM measurements. Another alternative is to assume that RLM RS will not be overridden by group common PDCCH.

Candidate channels are as follows.

Control channel transmitted over CSS may be used for RLF: Hypothesis of control channel (i.e. test control channel) may be used assuming transmitted in the CSS. Which CSS is used may also be configured. Or, any CSS may be used.

Control channel transmitted over GSS may be used for RLF. Which GSS is used may be configured. Or, any GSS may be used.

Control channel transmitted over USS may be used for RLF. Which USS is used may be configured. Or, any USS may be used.

Search space where channel quality measurement RS is transmitted may be used for RLF, based on hypothesis of control channel. For example, if shared RS for GSS is used for RLF, the target GSS may be used for RLF measurement. Which SS is used for RLF may be configured. CSS for RAR may be the default value.

If shared RS is used for RLF measurement, at least periodically RLF-RS may be transmitted regardless of transmission of common control and/or common data transmission.

3. Different Beam Direction Between Control and Data:

For example, TRP transmitting control channel and data channel may be different. In this case, beam direction for control and data may be different. Furthermore, even from the single TRP, finer beam may be used for data, whereas coarser beam is used for control transmission. In those cases, it may be necessary to change receiver beam. If this is supported, and the beam direction for data is dynamically selected, beam switching gap between control and data needs to be assured to allow RX beam switching. Semi-static configuration for data/control pairs may also be considered which may work without any additional gap. When dynamic indication is used for data beam, CSI-RS resource may be used to indicate the beam. In other words, for each CSI-RS resource, separate best RX beam direction/precoding may be used.

Furthermore, the switching gap may also be necessary to receive CSI-RS which uses different beam direction from data and/or control. Also similar gap may be necessary between control and data, if they uses different beam direction. For example, if a UE is configured with multiple CSI-RS resources with potentially different beam directions (and TX/RX beam pairs), to read proper CSI-RS, setting TX/RX beam pairs may be necessary. In this sense, the gap to switch RX beam may be necessary. Similar issue may also occur for SRS transmission or UL transmission. That is, if the TX beam changes between any two UL transmissions, necessary TX beam switching gap should be guaranteed. If more than one UL channels are transmitted simultaneously and different beam directions are used, the following approaches may be considered.

Drop one channel (e.g. based on UCI priority, power, etc.)
Transmit with the one beam direction: Beam direction may be determined based on
UCI priority, etc.
Transmit with the configured beam direction. Dynamic or semi-static beam direction change may be considered/
Transmit with the coarser beam direction
Transmit with the narrower beam direction In terms of RX beam switching or TX beam switching gap, the gap may be present in CP (thus, some samples from CPs should not be ignored/dropped) or one or a few OFDM symbols may be used for the gap. Even though precoding is different, beam direction change may not occur as long as the overall direction is the same (e.g. QCL relationship with respect to arrival angle). In such case, no additional gap may be used. The gap between control and data may also include any processing latency on control channel. In this sense, to change the beam direction, cross-slot scheduling may be used. Otherwise, additional gap to allow control channel decoding (and thus prepare proper RX beam for data) may be necessary for control/data for DL reception. Unless it is indicated otherwise, a UE may assume the same direction between control and data at least for DL reception. This may be assumed at least for same-subframe or same-slot scheduling, whereas different beam direction may be used for cross-slot or cross-subframe scheduling.

Alternatively, the gap between control and corresponding data may be always allowed for the better flexibility. The timing or the gap between two may also be dynamically or semi-statically indicated. When a UE needs to monitor multiple CORESET with potentially different TX/RX beam pairs, the gap may also be considered between CORESETs. Moreover, default beam for control and data may be different. This case may be necessary particularly when a UE is configured with multiple beam direction for control channel monitoring. For such a case, a UE may assume that the beam direction for data reception may be configured semi-statically which is independently configured from control beam direction. In multi-beam control channel configuration, the following options may be considered.

The same beam direction where control channel is detected may be used for data. In this case, depending on the required latency between the last control channel monitoring and data, different latency may be assumed. For example, if a UE is configured with multiple beam directions (e.g. 3 beams) and a UE detects a control signal at the 2nd beam, a UE may still need to read 3rd beam which may require beam switching before data reading. Before data reading, thus, beam switching from 3rd beam to data beam (2nd beam) may be necessary.

The same beam direction where the beam direction of the last control monitoring beam may be used for data, unless otherwise indicated. For example, if a UE is configured with 3 beams and a UE monitors all the beams all the time, the same beam which is used lastly may be used for the data beam.

Regardless of control beam, the default beam direction for data reading may be used.

A certain gap may always be present between control and data so that a UE is not required to monitor data during the gap or latency. In other words, if a UE can be configured dynamically different data beam direction from control beam direction, the latency may always be assumed between control and data. If there is no reason for a UE to monitor during the gap, a UE can skip monitoring during the gap.

When a UE is configured with multiple beams for control channel monitoring, if switching gap is considered, it may be accommodated in CP by increasing CP overhead.

When multiple beams are configured to control channel, once a UE detects a control channel, a UE may not be required to monitor other beams (and thus stop monitoring other beam directions). This approach is useful when the network only choose on beam out of the configured multiple beams depending on the condition. By stopping monitoring, a UE can save power. Also, if CSS data is transmitted, from a UE perspective, the same beam may be used between USS and CSS, unless different resource set is configured to CSS and USS. In other words, if a UE is configured with more than one COESET and each CORESET is configured with multiple beams, and if a control channel is detected from CORESET, a UE may stop monitor the remaining beams for the given CORESET. Alternatively, a UE may still need to monitor all configured beams regardless of detection of control channel.

If different beam is used between PUSCH and UCI transmission, a UE may create a switching gap autonomously by dropping one or a few symbols of PUSCH. The gap may be explicitly indicated by DCI for ending of PUSCH or UCI resource.

The beam direction may be indicated by scheduling DCI, and/or semi-statically configured. A UE may assume certain beam direction (for DL and UL) on certain resource, i.e. if certain resource is utilized, implicitly beam direction may be assumed.

4. Carrier Aggregation (CA)

CA may be viewed from the UE perspective. If UE is equipped with multiple RF to support wider bandwidth, even though the network may have a single wideband carrier, multiple carriers may be configured to the UE via CA. The proposal may also be applied to a case where a UE is configured with one wideband carrier with multiple RFs. When there is a PCell, beam direction information or precoding information of SS block transmission may be indicated by assisting cell or via SIB. When channel reciprocity is used, this may help pairing between TX/RX beams.

When CA is used, single level DCI and second level DCI may be transmitted from different carrier, or a common channel may be transmitted from different carrier from DCI. For example, scheduling carrier or PCell may transmit information of beam directions of each CORESET transmitted in SCell to minimize the UE complexity/power consumption. For example, every slot on PCell may indicate the list of beam directions used for SCell control transmission, and a UE may listen on the resources where the relevant beam directions are used. For example, if the cell has N beam directions for possible control channel transmission, N bits bitmap may be transmitted in every slot or with some periodicity from PCell to indicate whether there is any transmission from that beam direction. Or, a list of beam directions used for control channel transmission may also be indicated. When a UE does not detect this signal from the scheduling carrier, the UE may attempt to decode all possible control resource or may skip decoding on the corresponding slots.

Alternatively, a common signal for multi-beam operation may be transmitted via cross-carrier scheduling. In other words, a UE may acquire the common control signal from different carrier. When cross-carrier scheduling is used, any necessary information to schedule DCI in the scheduled carrier may also be configured, e.g., numerology, resource set, aggregation levels, etc. In other words, generally, the first level DCI may be transmitted from a carrier, whereas second level DCI may be transmitted from another carrier. In the resource configuration for first and second DCI search space or resources, cross-carrier resource allocation/configuration may be supported. When multi-level DCIs are scheduled from different carriers, the following approaches may be considered (but not limited to).

If cross-carrier is used for the first level DCI, UE-specific DCI may be used. In other words, the first level DCI may be scheduled per UE for cross-carrier scheduling case regardless of whether the first level DCI is group-common or cell-common or UE-specific. A UE may search the first level DCI for the cross-carrier scheduling case based on either cell radio network temporary identity (C-RNTI) or UE-specific RNTI.

If the first level DCI is a cell common or group-common DCI, separate RNTI may be configured per each carrier via higher layer signaling. It may be scheduled either via CSS or USS or GSS where a UE searches based on the RNTI configured to the scheduled carrier.

Separate GSS may be configured for each cross-carrier scheduled carrier. A UE may search with the same RNTI to the self-carrier scheduling case in the configured GSS for the scheduled carrier. GSS may be configured with separate time/frequency resources or a set of candidates in one or more of the configured search space in the scheduling carrier.

Cross-carrier multi-level DCI design may be effective when single-beam carrier and multi-beam carrier are aggregated. The first level DCI may be transmitted via single-beam which can further refine the information for the multi-beam case scheduling. In case of cross-carrier scheduling, control channel may be present in the middle of slot depending on the configuration.

More generally, CSS, GSS, USS can be configured in different carrier as long as the UE can access the carrier. For example, CSS for RAR may be configured in PCell for both PCell and SCell. Separate or shared search space may be configured among carriers. When numerology is different between PCell and SCell, cross-carrier scheduling may become a bit challenging. Thus, cross-carrier scheduling or cross-carrier multi-level DCI or cross-carrier common signaling may be configured only with the same numerology between scheduling and scheduled carrier at least for control transmission. When separate search space is configured, carrier indicator field (CIF) may not be necessary even though search space is configured in different carrier. If shared search space is used, CIF may be necessary. When more than one USS is configured, USS can be configured with self or cross-carrier scheduling.

In general, a UE may have a blind detection capability which may be divided into multiple search spaces and multiple search spaces may be placed in one or subset of carriers configured to the UE. Also, by configuring different time resource between search spaces, blind detection capability may be shared among multiple search spaces in different timing. In this sense, to minimize UE blind detection complexity increase, instead of placing CSS or GSS only in PCell, time division between different carriers for CSS or GSS may be considered (also dividing candidates among multiple carriers may be considered). This may also be applied between CSSs and/or GSSs in the same carrier if different DCI size is assumed.

Not only the scheduling DCI search space, but also any signaling such as indication of symbol puncturing, which may be transmitted at the end of slot or at the end of DwPTS, may also be transmitted via cross-carrier.

As search space for cross-carrier case may be configured to the subset of search spaces or different candidate sets within the same resource, ambiguity between self-carrier and cross-carrier may occur. In that case, self-carrier may have higher priority than cross-carrier, the first level DCI or common DCI may have higher priority that the second level or UE-specific DCI. If search space are divided between self-carrier or cross-carrier (or self-BWP and cross-BWP), it may not be necessary to carry CIF or BWP index.

Similarly for UCI transmission, multi-level UCI transmission may be considered, and different carrier may transmit different part of UCI or level of UCI. Furthermore, a UE may be configured that UCI of a DL carrier may be transmitted to another UL carrier. In other words, the grouping between DL carrier and UL carrier where UCI can be transmitted may be configured per UE or per cell or per UE group. For example, if a UE is configured with more UL carriers than DL, UCI cell may be assigned. For another example, if a UE is configured with FDD UL carrier and TDD DL carrier, different UL and also different duplexing may be further considered. When TDD and FDD are aggregated for DL and UL (or UL and DL), UCI transmission timing may be defined by UL carrier. If UL carrier is FDD (i.e. all UL slots are available for UCI transmission), basically FDD timing is adopted. If UL carrier is TDD, UCI timing may also follow TDD. UL HARQ may follow DL duplexing scheme. If DL is TDD, UL HARQ procedure may follow TDD timing, whereas DL is FDD, UL HARQ procedure may follow FDD timing. In terms of PUCCH offset, ACK/NACK resource indication/offset may follow UL carrier's duplexing. In other words, all the configurations may follow the carrier's duplexing where actual transmission may occur.

For LTE-NR coexistence, one example of associating TDD DL and FDD UL may be to utilize LTE UL spectrum for NR UL transmission for better coverage. In this case, depending on UE coverage, some UEs may use long PUCCH format, whereas some UEs may use short PUCCH formats. At least if slot size is 7, short PUCCH transmission may occur in the middle of LTE subframe, even though LTE and NR are tightly synchronized. To minimize the collision, PUCCH resources in each OFDM symbol may be configured differently. Also, different resources may be configured differently depending on the format. For example, for long PUCCH, to avoid potential collisions with LTE PUSCH, near system bandwidth edge may be configured so that LTE PUSCH can be scheduled with avoiding LTE/NR PUCCH regions. The offset where PUSCH can start may include both LTE and NR PUCCH resources. If short PUCCH is transmitted, if it collides with SRS symbol, PUCCH resource may configured so that it may be one of SRS configuration. In other words, PUCCH may be transmitted over SRS bandwidth, as if it's one UE's SRS resource. Otherwise, short PUCCH resource may be configured contiguously in PRBs to allow efficient multiplexing with LTE PUSCH.

To achieve some frequency diversity gain, more than one block may be assigned to short PUCCH transmission. In LTE-NR coexistence case, it may also be necessary to align hopping pattern between LTE and NR. This may be done by configuring UE BWP same as LTE hopping bandwidth, and applying the same LTE hopping pattern across NR UL BWP. To support this, at least in a frequency band where a UE may expect coexistence between LTE and NR, a UE may expect to support LTE frequency hopping pattern. This implies that a set of hopping patterns indicated by DCI may be configured differently per frequency range or per cell or per UE or per BWP.

5. Sharing CSS and USS

CSS or GSS may share the same time/frequency resource with USS. For example, CSS or GSS may be used to send transmit power command (TPC), fallback DCIs, RARNTI for RAR, etc. The CSS/GSS may also be used for common channel transmission. When different bandwidth UEs are configured, different bandwidth of USS may be configured per each UE. To allow sharing of CSS or GSS among such UEs, fixed and flexible resource may be defined within CORESET.

The fixed resource may have the following characteristics. The configured resources may be reserved for data transmission. In other words, data may be rate matched or punctured on the fixed resource. If a UE is scheduled with starting OFDM symbol of data earlier than the end OFDM symbol of the fixed resource, the fixed resource may be rate matched from the data mapping. The fixed resource may have shared RS based transmission with transmit diversity scheme. UL grant may be transmitted over fixed resource to avoid any ambiguity in data rate matching. Alternatively, the last CCE index or PRB index where a UE should perform rate matching on data may be dynamically indicated in DCI for handling DCIs for other UEs and/or UL grants.

The flexible resource set may have different RS transmission from the fixed resource, and data rate matching may be done based on the detected DCI rather than the reserved resource based or fixed rate matching.

In the fixed resource, CCE to REG mapping may be done in frequency first manner to achieve frequency diversity. In the flexible resource, CCE to REG mapping may be done in time first or localized manner. In other words, CCE to REG mapping may be different depending on the resource type. CCE index may be mapped from the fixed resource and continue to flexible resource.

FIG. 16 shows an example of fixed/flexible CORESET configuration according to an embodiment of the present invention. Regardless of fixed or flexible resources, some resources may be reserved. For example, referring to FIG. 16, some time/frequency resources may be reserved for another CSS/GSS configuration used for UEs monitoring different subbands or UEs with smaller subband. More specifically, depending on UE's bandwidth for control channel monitoring, different configuration may apply. For example, if UE bandwidth is M MHz, and M/2 MHz is used for the control channel monitoring, either configuration in 1st block for M/2 MHz or configuration in 2nd block for M/2 MHz may be configured to the UE. Fixed resource et may configured to be smaller than the UE control monitoring bandwidth to possibly support sharing with UEs with smaller bandwidth and/or supporting fallback operation in case of bandwidth adaptation.

FIG. 17 shows an example of CCE mapping according to an embodiment of the present invention. When distributed mapping between REG and CCE is used in fixed resource and localized mapping is used in flexible resource, CCE mapping may follow FIG. 17, assuming control resource configuration in case of M MHz in FIG. 16. In terms of USS/CSS mapping to fixed and flexible resource, USS or CSS or USS/CSS may be mapped to fixed/flexible resource, respectively.

6. Blind Detection Capability

In general, a UE can have a blind detection capability which may be divided into multiple search space, and multiple search space may be placed in one or subset of carriers configured to the UE. Also, by configuring different time resource between search spaces, blind detection capability may be shared among multiple search spaces in different timing. In this sense, to minimize UE blind detection complexity increase, instead of placing CSS or GSS only in PCell, time division between different carriers for CSS or GSS may be considered (also dividing candidates among multiple carriers may be considered). This may also be applied between CSSs and/or GSSs in the same carrier if different DCI size is assumed.

UE blind detection may be defined in two different mechanisms as follows.

- Maximum blind detection number may be predefined in the specification. When this approach is used, the reference numerology may be used. Or, different maximum blind detection number may be defined per numerology.
- A UE may report its blind detection capability. When a UE reports its blind detection capability, the UE may also use the reference numerology. For subcarrier spacing larger than reference numerology, blind detection number may be reduced linearly. For smaller subcarrier spacing that the reference numerology, blind detection number may be maintained as same or increased linearly. Alternatively, a UE may report its blind detection capability along with supported numerology. A UE may report its blind detection capability when its capability is larger than the specified value. Optionally, a UE may report its blind detection capability if it supports larger than the specified maximum.

In defining maximum blind detection number, the following approaches may be considered.

- Define total blind detection number per slot with given numerology: Regardless of configured CORESET number and duration, the total blind detection number may be defined within a slot. In this case, blind detection should be divided into multiple CORESETs within the slot. If different numerology is used, this approach may become a bit challenging. In that case, total blind detection based on the largest (or smallest or reference) subcarrier spacing may be assumed, and divided in to multiple CORESETs.
- Define total blind detection number ('max-BD') per OFDM symbol with given numerology: In this case, total blind detection may be defined based on the largest subcarrier spacing. If one CORESET of a numerology spans more than one OFDM symbol based on the largest subcarrier spacing, the maximum blind detection may be either 'max-BD' or m*'max-BD'. Here, m is the number of OFDM symbols based on the largest subcarrier spacing for a CORESET with a given numerology. The 'max-BD' may also be defined based on a reference numerology or smallest subcarrier spacing. In such case, depending on numerology, 'max-BD' may be increased or decreased. Alternatively, the same number of 'max-BD' can be used regardless of numerology and proper processing time may be handled by min-round trip time (RTT) or minimum processing time between control and data by UE signaling or configuration. In other words, if minimum processing time is numerology-agnostic, actual blind detection and handled TBS, etc., may be linearly scaled with subcarrier spacing. Otherwise, actual minimum processing time in slots may be increased as the numerology increased.

The Either approach may be used depending on UE capability whether a UE supports control channel monitoring smaller than slot duration. If a UE supports control monitoring interval smaller than a slot duration, the second approach may be used. In other words, alliterative approach is to define max-BD per number of OFDM symbols (n) with given numerology, where n is defined as the minimum control interval monitoring duration that the UE supports. Different n may be supported by different UEs. A UE may also indicate the capability whether the UE can support control channel monitoring smaller than slot, and if so, what is the minimum size of control monitoring interval. In the configuration, numerology may also be indicated if necessary (or assumed to use reference numerology). Otherwise, the same value may be used across all numerologies supported by the UE, assuming that the capability is reported based on the largest subcarrier spacing. In other words, a UE may report its minimum control monitoring interval and total BD within that minimum interval. Particularly, the minimum control monitoring interval may be tied with bandwidth that the UE supports. If supported bandwidth is small, the minimum duration may be generally larger.

For example, it is assumed that reference numerology is 15 kHz subcarrier spacing and, max-BD is defined per OFDM symbol as 8. If a UE uses 30 kHz subcarrier spacing, max-BD per OFDM symbol may be 4. If CORESET duration is 1, max-BD may be 4. If CORESET duration is 2, max-BD may be either 4 or 8 (depending on option).

7. RMSI CORESET Configuration

In PBCH, the configuration of RMSI CORESET needs to be indicated. In terms of resource, the following information may be considered.

Bandwidth
Frequency location
Monitoring interval
Numerology
CORESET duration
REG bundle configuration Also, for information for RMSI PDSCH itself, information on bandwidth, frequency location (or BWP), and numerology may need to be indicated.

For bandwidth, the following options may be considered for RMSI CORESET.

Same as UE minimum bandwidth (which can be defined per frequency range)
Half of UE minimum bandwidth
Same as SS block
Same number of PRBs to SS block and actual bandwidth may be different depending on the numerology used in PBCH and RMSI CORESET For frequency location, it may be considered to share the same center between RMSI CORESET and SS block. Depending on the offset between center of SS block and center of carrier, offset in terms of RBs based on PBCH numerology may be additionally indicated, and the center of RMSI CORESET may be shifted on that offset. Offset value can be −K−1, −K−2 . . . 0, 1 . . . K−1, where K is 0 if RMSI subcarrier spacing is smaller than that of PBCH, and K=SCi/SC0 if SCi is used for RMSI and SC0 is the numerology of PBCH. A few entries may be considered for left/right shift of RMSI CORESET within UE minimum bandwidth around SS block. A UE may not switch its center frequency to access SS block in this case. Further entries to allow RMSI sharing among multiple SS blocks may be considered. Center of carrier nay be indicated, the offset between center of carrier and RMSI CORESET may be indicated.

For monitoring interval for RMSI CORESET, period and offset may be configured. Or only periodicity is configured and offset may be determined based on SS block index.

For numerology for RMSI CORESET, between the same numerology to RMSI, and one other candidate (e.g. 30 kHz in below 6 GHz) may be indicated by 1 bit field.

For CORESET duration, the maximum CORESET duration or the control region size may be predefined based on the slot length used in the carrier. Depending on slot size, the control region size may be different (e.g. 7 symbol slot includes 1 symbol control region, whereas 14 symbol slot includes 2 symbol control region). When numerology of RMSI is larger than numerology of PBCH, the slot duration between 7 or 14 may be indicated in PBCH based on numerology of PBCH, and the number of control region may be 1*K (K=SCi/SC0) for 7 symbol slot case and 2*K for 14 symbol slot case. In opposite case, 7 symbol slot for PBCH may not be supported, or 1 symbol control region may be assumed. Within a control region, the duration of CORESET may be a default value (e.g. the same size to control region duration in below 6 GHz, and 1 symbol in above 6 GHz or always 1 symbol regardless of frequency range). When 1 symbol is assumed for CORESET duration, the control region duration may imply the possible number of beams transmitted in each slot. Based on the information, if there is TDM among different beams, a UE may determine offset for the corresponding beam for RMSI CORESET monitoring.

For REG bundle size, REG bundle size may be determined based on CORESET duration. Or, regardless of CORESET duration, it may be fixed as, e.g. 2 RB*1 symbol or 6 REGs (frequency/time domain). In terms of REG-CCE mapping, distributed/interleaved option may always be used.

For wideband RS transmission, if wideband RS is used for RMSI CORESET, the following options may be considered.
  Center of carrier frequency and offset on RMSI CORESET may be known to UE so that wideband RS may be generated across carrier (assuming maximum system bandwidth which can be different per frequency range)
  Wideband RS may be locally generated within RMSI CORESET and RMSI CORESET information may be indicated to RRC_CONNECTED UEs so that a UE knows different RS scrambling may be used within RMSI CORESETs in the carrier.
  Wideband RS may be locally generated based on the center of SS block. Wideband RS may be concatenated on RSs and each RS may be generated around each SS block. For this, a UE needs to be informed with information of SS blocks (at least frequency information) in the carrier. The bandwidth for this approach may be UE minimum bandwidth, assuming that UE is not required to retune beyond its minimum bandwidth. Different bandwidth such as twice of UE minimum bandwidth may be considered with potential retuning. The value may also be related to frequency location information for RMSI CORESET.

For bandwidth for RMSI PDSCH for resource allocation & UE monitoring, the followings options may be considered.
  Same as RMSI CORESET
  Same as SS block (in terms of number of PRBs or in terms of actual bandwidth)
  Same as UE minimum bandwidth around SS block (regardless of CORESET configuration)
For numerology used for RMSI PDSCH, the followings options may be considered.
  Same as RMSI CORESET
  Fixed as a value which is defined per frequency range
  Indicated in control
  Indicated in PBCH
For frequency location for RMSI PDSCH, the followings options may be considered.
  Similar mechanism to RMSI CORESET configuration may be considered if they are not aligned.
  UE minimum bandwidth around SS block
For resource allocation in frequency/time domain (e.g. RBG size, multi-slot scheduling, etc.), the followings options may be considered.
  RBG size may be fixed per frequency range (depending on UE minimum bandwidth, RBG size may also be defined). Different RBG size may be used depending on the configured bandwidth for RMSI PDSCH transmission. RBG starting position/offset may also be indicated to inform where to start RBG grouping. Offset value may be 0 to P−1 where P is the RBG size. The offset may also be indicated by DCI to reduce overhead of PBCH. Alternatively, it may be indicated by PBCH. Joint indication of PRB grid offset and RBG starting position/offset may also be considered.
  RBG size may also be configured/indicated by PBCH or DCI.
  Time domain may be single slot, unless otherwise indicated. DCI overhead or format used for RMSI PDSCH scheduling may be compact DCI.
  Set of aggregation levels (ALs) and number of candidates may be fixed at least for
  RMSI CORESET. If the same CORESET is shared with other CSS, different AL/candidates may be be configured afterwards.
For timing relationship of RMSI PDSCH, the followings options may be considered.
  Prefixed timing may be considered and timing may be determined by the maximum UE RTT timing which is the maximum value of minimum RTT values of UEs.
  Dynamic timing indication may be considered.

FIG. 18 shows an example of RMSI and SS block transmission according to an embodiment of the present invention. In FIG. 18, it is assumed that SCi=2*SC0. RMSI PDSCH may be rate matched around SS block transmission or SS block defined in the specification. Potential SS blocks may be rate matched as the information of active SS block may not be known to UE. Alternatively, active SS block may be indicated in PBCH and actual rate matching may be based on active SS block.

FIG. 19 shows an example of RBG and PRB grid offset according to an embodiment of the present invention. Similar signaling may also be indicated in RMSI if RMSI uses the same numerology as PBCH and other transmission may use different numerologies. If it is signaled from RMSI or other SI or UE-specific signaling, value per each numerology may also be indicated.

8. PRACH Configuration

PRACH configuration may include center and PRACH numerology. Considering different PRACH resources in different frequency bands, frequency band indication may also be included in PRACH configuration. If the information is not available, the same band to DL may be used. In terms of PRB indexing for UL, the reference may be based on center of PRACH frequency. For each PRACH center frequency, the offset in terms of PRB grid for UL may be indicated. The gap between two PRACH resources may be multiple of RBs or subcarrier spacing of numerology used for PBCH. Similar to SS block, if a UE creates PRB grid around at the center of PRACH transmission which may be used for Msg 3 transmission, the offset may be indicated for different numerology. For bandwidth part configuration for Msg 3 transmission, UE minimum UL bandwidth may be around PRACH. Similar to RMSI CORESET configuration, the bandwidth and frequency location of Msg 3 bandwidth part may be configured along with PRACH configuration.

Offset between center & PRACH resource may also be indicated at least if PRACH resource is not in the same band.

FIG. 20 shows a method for determining a control resource set for system information by a UE according to an embodiment of the present invention. The present invention described above may be applied to this embodiment.

In step S100, the UE receives a configuration of CORESET for RMSI via a SS block from a network. In step S110, the UE determines the COREST for the RMSI according to the configuration. The SS block includes a PBCH.

A time and frequency location of a CSS for the RMSI may be aligned with the SS block. In this case, a beam index for the control resource set may be the same as a beam index for the SS block. The configuration may include at least one of a bandwidth of the CSS for the RMSI, a frequency location represented by an offset, a numerology used for the CSS for the RMSI, a periodicity of the CSS for the RMSI monitoring or duration and starting symbol of the control resource set.

Or, a frequency location of a CSS for the RMSI is aligned with the SS block. Or, a frequency location of a CSS for the RMSI is not aligned with the SS block. Or, a frequency location of a CSS is not aligned with the SS block, but a frequency location of the RMSI is aligned with the SS block.

The CORESET for the RMSI may be determined per each of a plurality of beams. Furthermore, the CORESET for the RMSI is determined per each of a plurality of BWPs.

The CORESET for the RMSI may be rate matched on an orthogonal frequency division multiplexing (OFDM) symbol which is overlapped with resources for the SS block. Or, the CORESET for the RMSI may be rate matched on entire OFDM symbols of resources for the SS block.

Separate resources for the RMSI per each beam direction may be indicated. The SS block may be configured before a CSI-RS is configured.

The SS block may include at least one of PSS or SSS, and at least one of the PSS or the SSS may be used for RLM.

FIG. 21 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method performed by a user equipment (UE) in a wireless communication system, the method comprising:
   receiving, from a network, a configuration of a control resource set for a remaining minimum system information (RMSI) via a physical broadcast channel (PBCH) included in a synchronization signal (SS) block;
   determining the control resource set for the RMSI based on the configuration;
   monitoring a control channel to receive downlink control information (DCI) in the control resource set for the RMSI based on a beam which is related to the SS block; and
   receiving, from the network, the RMSI based on the DCI,
   wherein the SS block is received before a UE-specific configuration related to a channel state information reference signal (CSI-RS) is received, and
   wherein, after the UE-specific configuration related to the CSI-RS is received:
      a control channel is monitored based on a beam which is related to the CSI-RS, and
      the CSI-RS is used for radio link monitoring (RLM).

2. The method of claim 1, wherein a time and frequency location of a common search space (CSS) for the RMSI is aligned with the SS block by at least one of time division multiplexing (TDM) or frequency division multiplexing (FDM).

3. The method of claim 2, wherein the configuration includes at least one of a bandwidth of the CSS for the RMSI, a frequency location represented by an offset, a numerology used for the CSS for the RMSI, a periodicity of the CSS for the RMSI monitoring or duration and starting symbol of the control resource set.

4. The method of claim 1, wherein a frequency location of a CSS for the RMSI is aligned with the SS block.

5. The method of claim 1, wherein a frequency location of a CSS for the RMSI is not aligned with the SS block.

6. The method of claim 1, wherein a frequency location of a CSS is not aligned with the SS block, but a frequency location of the RMSI is aligned with the SS block.

7. The method of claim 1, wherein the control resource set for the RMSI is determined per each of a plurality of beams.

8. The method of claim 1, wherein the control resource set for the RMSI is determined per each of a plurality of bandwidth parts (BWPs).

9. The method of claim 1, wherein the control resource set for the RMSI is rate matched on an orthogonal frequency division multiplexing (OFDM) symbol which is overlapped with resources for the SS block.

10. The method of claim 1, wherein the control resource set for the RMSI is rate matched on entire OFDM symbols of resources for the SS block.

11. The method of claim 1, wherein separate resources for the RMSI per each beam direction are indicated.

12. A user equipment (UE) configured to operate in a wireless communication system, the UE comprising:
    at least one transceiver;
    at least one processor; and
    at least one computer memory operably connected to the at least one processor and storing instructions that, based on being executed by the at least one processor, perform operations comprising:
    receiving, from a network, a configuration of a control resource set for a remaining minimum system information (RMSI) via a physical broadcast channel (PBCH) included in a synchronization signal (SS) block;
    determining the control resource set for the RMSI based the configuration;
    monitoring a control channel to receive downlink control information (DCI) in the control resource set for the RMSI based on a beam which is related to the SS block; and
    receiving, from the network, the RMSI based on the DCI,
    wherein the SS block is received before a UE-specific configuration related to a channel state information reference signal (CSI-RS) is received, and
    wherein, after the UE-specific configuration related to the CSI-RS is received:
        a control channel is monitored based on a beam which is related to the CSI-RS, and
        the CSI-RS is used for radio link monitoring (RLM).

13. The method of claim 1, wherein the UE is in communication with at least one of a wireless device, a network, and/or autonomous vehicles other than the UE.

* * * * *